(12) United States Patent
Kudo et al.

(10) Patent No.: US 9,550,414 B2
(45) Date of Patent: Jan. 24, 2017

(54) TRAVELING DRIVE DEVICE FOR DUMP TRUCK

(71) Applicant: HITACHI CONSTRUCTION MACHINERY, CO., LTD., Tokyo (JP)

(72) Inventors: Keiji Kudo, Kasumigaura (JP);
Shinichirou Hagihara, Tsuchiura (JP);
Yasunori Tanaka, Ibaraki (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 14/388,905

(22) PCT Filed: Jun. 18, 2013

(86) PCT No.: PCT/JP2013/066727
§ 371 (c)(1),
(2) Date: Sep. 29, 2014

(87) PCT Pub. No.: WO2014/002829
PCT Pub. Date: Jan. 3, 2014

(65) Prior Publication Data
US 2015/0084397 A1    Mar. 26, 2015

(30) Foreign Application Priority Data

Jun. 29, 2012   (JP) .................................. 2012-147361
Oct. 31, 2012   (JP) .................................. 2012-240162

(51) Int. Cl.
*B60B 27/02* (2006.01)
*B60K 7/00* (2006.01)
(Continued)

(52) U.S. Cl.
CPC ......... *B60K 7/0007* (2013.01); *B60B 27/0015* (2013.01); *B60B 27/0052* (2013.01);
(Continued)

(58) Field of Classification Search
CPC .. B60B 27/02; B60B 27/0015; B60B 27/0052;
B60B 35/16; F16D 65/123
See application file for complete search history.

(56) References Cited

U.S. PATENT DOCUMENTS 2,417,855 A * 3/1947 Barish ..................... F16D 55/32
188/152
2,926,760 A * 3/1960 Lucien .................. F16D 65/123
188/218 XL
(Continued)

FOREIGN PATENT DOCUMENTS

CN       101516640 A    8/2009
GB       2 093 949 A    9/1982
(Continued)

OTHER PUBLICATIONS

Chinese Office Action received in corresponding Chinese Application No. 201380033755.5 dated Mar. 23, 2016.

*Primary Examiner* — J. Allen Shriver, II
*Assistant Examiner* — Steve Clemmons
(74) *Attorney, Agent, or Firm* — Mattingly & Malur, PC

(57) ABSTRACT

A traveling drive device for a dump truck is provided with an axle housing mounted to a vehicle body, a wheel mounting tube rotatably provided on the outer periphery side of the axle housing, a disk holding cylinder provided on the axial outside of the wheel mounting tube, a brake disk mounted to the disk holding cylinder, and a brake device for applying braking to the brake disk. The disk holding cylinder is configured by a cylindrical body to be mounted to the wheel mounting tube and a plurality of disk mounting legs provided on the cylindrical body. A plurality of U-shaped projections are provided on the outer periphery side of the brake disk at positions corresponding to the respective disk mounting legs. A recessed groove which fits on the disk (Continued)

mounting leg so as to hold a distal end thereof is provided in each of the U-shaped projections.

3 Claims, 22 Drawing Sheets

(51) Int. Cl.
| | | |
|---|---|---|
| *F16D 65/12* | (2006.01) | |
| *B60B 27/00* | (2006.01) | |
| *B60B 35/16* | (2006.01) | |
| *B60B 35/14* | (2006.01) | |
| *B60B 35/12* | (2006.01) | |
| *B60K 17/04* | (2006.01) | |
| *F16D 55/00* | (2006.01) | |
| *F16D 65/02* | (2006.01) | |

(52) U.S. Cl.
CPC ............ *B60B 27/02* (2013.01); *B60B 35/16* (2013.01); *F16D 65/123* (2013.01); *B60B 35/125* (2013.01); *B60B 35/14* (2013.01); *B60B 2900/321* (2013.01); *B60K 17/046* (2013.01); *B60K 2007/0038* (2013.01); *B60K 2007/0092* (2013.01); *B60Y 2200/15* (2013.01); *B60Y 2200/40* (2013.01); *F16D 2055/0083* (2013.01); *F16D 2065/1308* (2013.01); *F16D 2065/1364* (2013.01); *Y10S 903/915* (2013.01); *Y10S 903/952* (2013.01)

(56) References Cited

U.S. PATENT DOCUMENTS

| | | | | | |
|---|---|---|---|---|---|
| 3,927,740 | A | * | 12/1975 | Zarembka | ............ F16D 65/126 |
| | | | | | 188/218 XL |
| 4,282,952 | A | * | 8/1981 | Bartley | ................... B60B 23/10 |
| | | | | | 180/10 |
| 4,511,021 | A | * | 4/1985 | Grider | ................... F16D 65/126 |
| | | | | | 188/218 XL |
| 4,641,731 | A | * | 2/1987 | Kawaguchi | ............. B60T 1/065 |
| | | | | | 188/18 A |
| 4,662,482 | A | * | 5/1987 | Bass | ....................... B60B 1/003 |
| | | | | | 188/18 A |
| 4,749,065 | A | * | 6/1988 | Loeber | .................. F16D 65/123 |
| | | | | | 188/18 A |
| 8,061,785 | B2 | * | 11/2011 | Ilg | ........................... F16D 65/12 |
| | | | | | 188/18 A |
| 8,292,046 | B2 | * | 10/2012 | Masoni | .................... B60B 27/00 |
| | | | | | 188/18 A |
| 2010/0084911 | A1 | | 4/2010 | Ilg | |

FOREIGN PATENT DOCUMENTS

| | | | | |
|---|---|---|---|---|
| JP | 58-12730 | | 1/1983 | |
| JP | 62-199545 | | 12/1987 | |
| JP | 2006-264395 A | | 10/2006 | |
| JP | 2006264395 A | * | 10/2006 | |
| SE | WO 2009154548 A1 | * | 12/2009 | ............ F16D 65/12 |

* cited by examiner

TRAVELING DRIVE DEVICE FOR DUMP TRUCK

TECHNICAL FIELD

The present invention relates to a traveling drive device for a dump truck which is favorably used as a large carrier for carrying crushed stone materials which are mined in an open pit quarry, a stone quarry, a mine and the like.

BACKGROUND ART

In general, the large carrier which is called the dump truck is provided with a vessel (a loading platform) which is made liftable on a frame of a vehicle body. This dump truck is adapted to travel in a state of loading a large amount of crushed stones on the vessel.

The traveling drive device which drives a driving wheel of the dump truck for traveling is provided with a tubular axle housing which is mounted to a vehicle body in a non-rotational state and in which a drive source is provided, a rotational shaft which is provided so as to axially extend in the axle housing and is rotationally driven by the drive source, a wheel mounting tube which is rotatably provided on the axial outside (the side axially opposite to the drive source) of the aforementioned axle housing and on its outer periphery side via a wheel support bearing and to which a wheel is mounted, a reduction mechanism which is provided between the wheel mounting tube and the aforementioned axle housing to decelerate and transmit rotation of the aforementioned rotational shaft to the wheel mounting tube, a disk holding cylinder is provided on the axial outside (the side axially opposite to the axle housing) of the wheel mounting tube, an annular brake disk which is mounted to the disk holding cylinder to rotate together with the wheel, and a brake device for applying braking to the aforementioned wheel mounting tube by pressing a friction pad against the brake disk (See, Patent Document 1).

PRIOR ART DOCUMENT

Patent Document

Patent Document 1: Japanese Patent Laid-Open No. 2006-264395 A

The traveling drive device for dump truck makes it possible to perform maintenance and inspection work on the brake device without removing the wheel by installing the brake device on the axial outside of the wheel mounting tube.

SUMMARY OF THE INVENTION

Incidentally, in the above-mentioned traveling drive device according to the conventional art, a plurality of disk mounting legs is circumferentially provided on the disk holding cylinder at intervals. A plurality of projecting portions which radially projects from an outer peripheral edge of the brake disk is provided at positions corresponding to these respective disk mounting legs. In this traveling drive device, the brake disk is held by the disk holding cylinder by fitting together each disk mounting leg of the disk holding cylinder and each projection of the brake disk.

Therefore, in a case where braking is applied to the dump truck which is traveling in a state of loading a large amount of crushed stones and the like on the loading platform by the brake device, a large load is applied on a fitting portion between the disk mounting leg of the disk holding cylinder and the projection of the brake disk. Therefore, there is such a problem that durability of the disk holding cylinder or the brake disk is reduced.

On the other hand, in a case where the brake disk is directly mounted to the axial outside of the disk holding cylinder by using many bolts, there is such a problem that workability when mounting and demounting the brake disk is remarkably reduced. On the other hand, in a case where the cylindrical disk holding cylinder is axially extended up to a brake disk surface, it leads to an increase in weight of the disk holding cylinder, that is, an increase in vehicle body weight. Since in the dump truck, the increase in vehicle body weight leads to a reduction in cargoes to be loaded, it induces a reduction in commercial value. Further, since when the disk holding cylinder is axially lengthened, a wedge-shaped clamp member for fixing a rim is also lengthened and the weight of the clamp member exceeds 20 kg, assemblability is remarkably reduced. Therefore, it is difficult to change a structure which is called the holding cylinder having the disk mounting leg.

In view of the above-discussed problems with the conventional art, it is an object of the present invention to provide a traveling drive device for dump truck which makes it possible to increase the durability of the disk holding cylinder and the brake disk and makes it possible to easily perform the work of mounting and demounting the brake disk.

(1). The present invention is applied to a traveling drive device for dump truck comprising: a tubular axle housing which is mounted to a vehicle body of a dump truck in a non-rotational state and in which a drive source is provided; a rotational shaft which is provided so as to axially extend in the axle housing and is rotationally driven by the drive source; a wheel mounting tube which is rotatably provided on the axial outside of the axle housing and on the outer periphery side thereof via wheel support bearings and to which a wheel is mounted; a reduction mechanism which is provided between the wheel mounting tube and the axle housing to decelerate rotation of the rotational shaft for transmission to the wheel mounting tube; a tubular disk holding cylinder which is provided to be located on the axial outside of the wheel mounting tube; an annular brake disk which is mounted to the disk holding cylinder to rotate together with the wheel mounting tube; and a brake device which applies braking to the wheel mounting tube by pressing a friction pad against the brake disk.

The characteristic of the present invention lies in a configuration that the disk holding cylinder is configured by a cylindrical body which is mounted to the wheel mounting tube and a plurality of disk mounting legs which is provided on the cylindrical body at intervals in a circumferential direction thereof and axially project outward from the cylindrical body, U-shaped projections which are respectively disposed at positions corresponding to the respective disk mounting legs are provided on the outer periphery side of the brake disk, and the U-shaped projections each are configured to have a recessed groove to be fitted on each of the disk mounting legs so as to hold a distal end of each of the disk mounting legs therein in the circumferential direction.

With this arrangement, the brake disk can be reliably held by the disk holding cylinder by bringing the recessed groove of the U-shaped projection provided on the outer periphery side of the brake disk into fit on the distal end of the disk mounting leg which is axially projected outward from the cylindrical body of the disk holding cylinder. In this case, since the U-shaped projection is provided on the outer periphery side of the brake disk, its bending strength can be heightened by increasing the circumferential length dimension of the U-shaped projection so as to increase the sectional area. Therefore, when braking is applied to the wheel mounting tube by the brake device, the load which is applied from the disk mounting leg of the disk holding cylinder can be reliably received by the U-shaped projection of the brake disk.

As a result, even when the large load is repetitively applied from the disk mounting leg of the disk holding cylinder onto the U-shaped projection of the brake disk when braking by the brake device, this load can be reliably received by the U-shaped projection of the brake disk. Therefore, the durability of the disk holding cylinder and the brake disk can be increased. In addition, the brake disk can be readily mounted to the disk holding cylinder simply by holding the disk mounting leg of the disk holding cylinder by the U-shaped projection of the brake disk. As a result, in comparison with a case where the brake disk is directly mounted to the disk holding cylinder, for example, by using many bolts, the workability when mounting and demounting the brake disk can be increased.

(2). According to the present invention, it is configured such that the brake disk is configured by a friction pad abutting ring against which the friction pad of the brake device abuts and each of the U-shaped projections which are provided on an outer peripheral edge of the friction pad abutting ring, and an axial thickness dimension of each of the U-shaped projections is made larger than an axial thickness dimension of the friction pad abutting ring.

With this arrangement, a contact area of the disk mounting leg of the disk holding cylinder with the U-shaped projection of the brake disk can be increased by making the thickness dimension of the U-shaped projection of the brake disk larger than the thickness dimension of the friction pad abutting ring. Therefore, the load which is applied from the disk mounting leg of the disk holding cylinder onto the U-shaped projection of the brake disk when braking by the brake device can be received across the large area. As a result, since surface pressure strength of the both can be increased, the durability of the disk holding cylinder and the brake disk can be further increased.

(3). According to the present invention, it is configured such that an arc-shaped disk side arcuate portion is provided on a corner part where an inner surface facing the cylindrical body in the friction pad abutting ring and an inner surface facing the cylindrical body in each of the U-shaped projections meet.

With this arrangement, the friction pad abutting ring of the brake disk and each of the U-shaped projections can be smoothly seriated with each other via the arc-shaped disk side arcuate portion. Thereby, concentration of the stress on a boundary part between the friction pad abutting ring of the brake disk and each of the U-shaped projections can be suppressed when braking by the brake device and the strength of the brake disk can be increased.

(4). According to the present invention, it is configured such that each of the disk mounting legs of the disk holding cylinder is configured by a platform which axially projects from the cylindrical body, a recessed groove fitting projection which is provided on the distal end side of the platform by having a dimension which is smaller than a circumferential or radial length dimension of the platform and on which the recessed groove of the brake disk fits, and a stepped portion which is provided between the platform and the recessed groove fitting projection and against which the U-shaped projection abuts.

With this arrangement, when the recessed groove provided in the U-shaped projection of the brake disk is brought into fit on the recessed groove fitting projection of the disk mounting leg, the U-shaped projection of the brake disk abuts against the stepped portion of the disk mounting leg. Thereby, since the brake disk can be mounted to the disk holding cylinder always at an appropriate position, the workability when mounting the brake disk to the disk holding cylinder can be increased.

(5). According to the present invention, it is configured such that an arc-shaped step side arcuate portion is provided on a corner part where the recessed groove fitting projection and the stepped portion of each of the disk mounting legs meet, and an arc-shaped cylindrical body side arcuate portion is provided on a corner part where the cylindrical body and the platform of each of the disk mounting legs meet.

With this arrangement, the recessed groove fitting projection of each of the disk mounting legs and the stepped portion can be smoothly seriated with each other via the arc-shaped step side arcuate portion. On the other hand, the cylindrical body of the disk holding cylinder and each of the disk mounting legs can be smoothly seriated with each other via the arc-shaped cylindrical body side arcuate portion. Thereby, concentration of the stress on the boundary part between the recessed groove fitting projection of each of the disk mounting legs and the stepped portion can be suppressed when braking by the brake device and the strength of the recessed groove fitting projection can be increased. In addition, concentration of the stress on the boundary part between the cylindrical body of the disk holding cylinder and each of the disk mounting legs can be suppressed and the strength of each of the disk mounting legs can be increased.

(6). According to the present invention, it is configured such that a disk fixing member adapted to axially fix the brake disk to the disk mounting leg is mounted between the recessed groove fitting projection of each of the disk mounting legs and the U-shaped projection of the brake disk.

With this arrangement, the U-shaped projection of the brake disk can be held by the stepped portion of the disk mounting leg and the disk fixing member by mounting the brake disk to the disk mounting leg by using the disk fixing member in a state of leaving the recessed groove of the brake disk fitted on the recessed groove fitting projection of each disk mounting leg. Thereby, since the brake disk can be axially fixed, the workability when mounting and demounting the brake disk can be increased in comparison with a case of mounting the brake disk directly to the brake mounting tube by using many bolts.

(7). According to the present invention, it is configured such that each disk mounting leg of the disk holding cylinder is configured by a platform which axially projects from the cylindrical body, a recessed groove fitting projection which is provided on the distal end side of the platform by having a dimension which is smaller than a circumferential length dimension of the platform and on which the U-shaped projection of the brake disk fits, and an arc-shaped curved-surface portion which is provided between the platform and the recessed groove fitting projection to smoothly seriate the both with each other.

With this arrangement, the both can be coupled together by the smoothly seriated curved surface portion without an occurrence of a sudden change in shape between the platform and the recessed groove fitting projection. As a result, concentration of the stress on the boundary part between the platform and the recessed groove fitting projection can be suppressed and the strength of the disk mounting leg can be increased.

(8). According to the present invention, it is configured such that a positioning member which axially positions the brake disk relative to each of at least two disk mounting legs in the disk mounting legs is provided between each of at least the disk mounting legs and the U-shaped projections of the brake disk, and the positioning member is configured by a recessed groove engaging portion which engages with a recessed groove of the U-shaped projection, a leg mounting portion which is mounted to a recessed groove fitting projection of the disk mounting leg, and a disk abutting portion which positions the brake disk by abutting against the U-shaped projection of the brake disk.

With this arrangement, the leg mounting portion of the positioning member can be mounted to the recessed groove fitting projection by bringing the recessed groove of the brake disk into fit on the recessed groove fitting projection of each disk mounting leg in a state of leaving the recessed groove engaging portion of the positioning member engaged with the recessed groove provided in the U-shaped projection of the brake disk. At that time, the brake disk can be axially positioned relative to the disk mounting leg by abutting the disk abutting portion of the positioning member against the U-shaped projection of the brake disk.

(9). According to the present invention, it is configured such that the reduction mechanism has a ring gear which is mounted to the wheel mounting tube and on the inner periphery side of which inner teeth are formed, the disk holding cylinder is configured to be mounted to the wheel mounting tube coaxially with the ring gear, and the disk holding cylinder configures a part of the wheel mounting tube together with the ring gear. Thereby, the disk holding cylinder and the ring gear can configure the part of the wheel mounting tube and the workability when assembling the wheel mounting tube can be increased.

MODE FOR CARRYING OUT THE INVENTION

Hereinafter, embodiments of the traveling drive device for dump truck according to the present invention will be described in detail while referring to the accompanying drawings.

Figure 1:
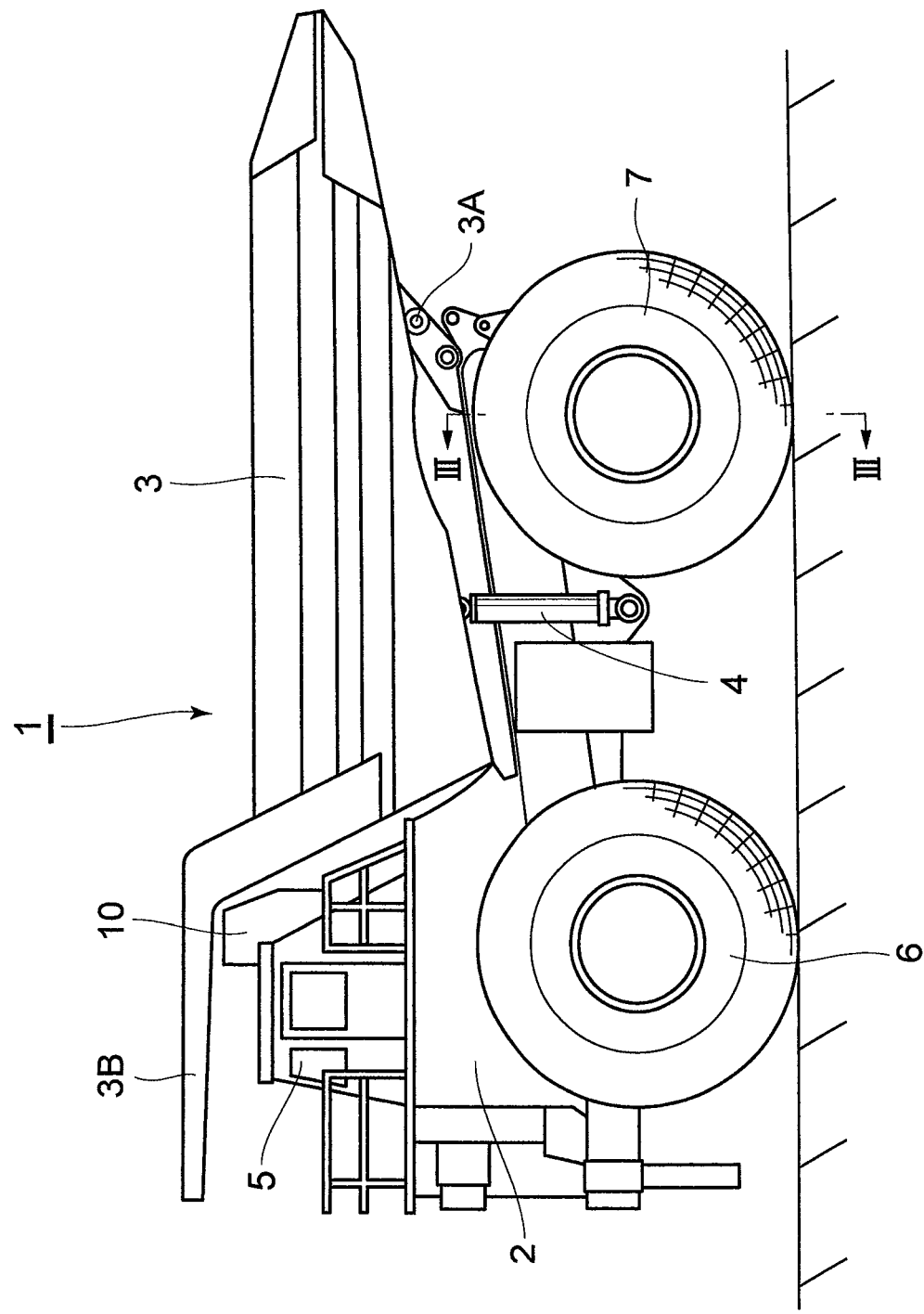
FIG. 1 is a front view showing a dump truck according to a first embodiment of the present invention.

In the drawings, designated at 1 is a dump truck which is adopted in a first embodiment. The dump truck 1 is largely constituted by a vehicle body 2 which makes up a rigid frame structure and a vessel 3 used as a platform which is liftably mounted on the vehicle body 2 as shown in FIG. 1.

The vessel 3 is formed as a large container having a total length which ranges from 10 m to as long as 13 m in order to load a large amount of, for example, crushed stones. A rear side bottom of the vessel 3 is liftably (tiltably) coupled to the rear end side of the vehicle body 2 via a pin coupling portion 3A. A protector 3B which covers a cabin 5 which will be described later from above is integrally provided on a front upper part of the vessel 3.

A hoist cylinder 4 which is adapted to hoist the vessel 3 is located between the vehicle body 2 and the vessel 3 and is disposed one on each of the left and right both sides. The hoist cylinder 4 is adapted to hoist (tilt) the vessel 3 centering on the pin coupling portion 3A by vertically expanding/contracting in accordance with pressurized oil supplying/discharging from/to the outside.

The cabin 5 is located under the protector 3B and is provided on a front part of the vehicle body 2 and the cabin 5 forms a operator's room that a driver of the dump truck 1 gets on and off. A operator's seat, a start switch, an acceleration pedal, a brake pedal, a steering handle and a plurality of operation levers and the like (none of them are shown) are provided in the cabin 5.

The protector 3B of the vessel 3 is adapted to protect the cabin 5 from, for example, a flying stone such as rock and the like and at the same time to protect the driver in the cabin 5 even in case of occurrence of turnover of the vehicle (the dump truck 1) by covering the cabin 5 from above substantially fully.

Left and right front wheels 6 are rotatably provided on the front side of the vehicle body 2, and each of the front wheels 6 configures a steering wheel to be steered (steeringly operated) by the driver of the dump truck 1. The front wheel 6 is formed by having a tire diameter (an outer diameter dimension) which ranges, for example, from 2 to as long as 4 m similarly to a rear wheel 7 which will be described later.

Figure 3:
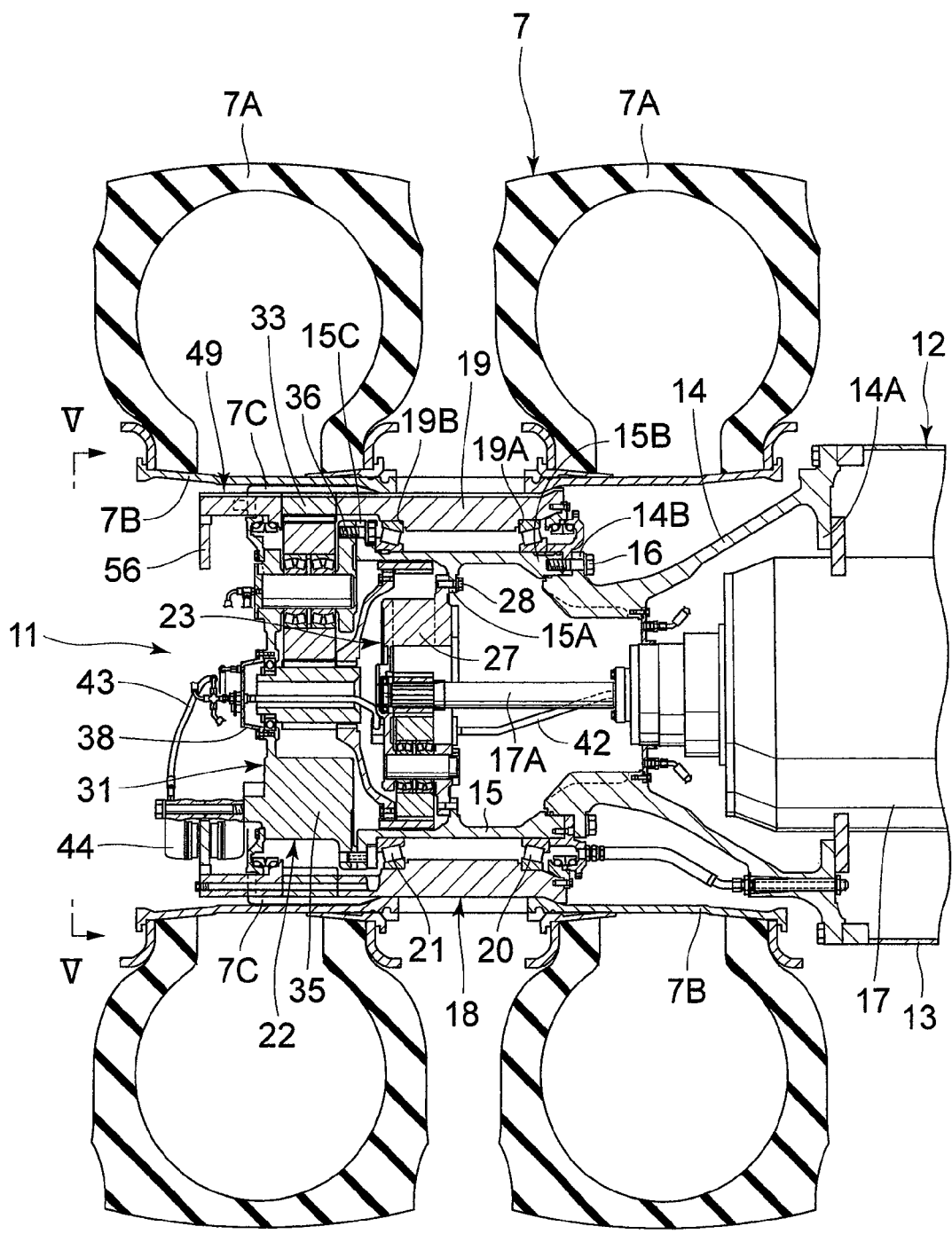
FIG. 3 is a sectional view showing the traveling drive device on the rear wheel side in a state that a wheel cap is removed as viewed in the direction of arrows III-III in FIG. 1.

The left and right rear wheels 7 are rotatably provided on the rear side of the vehicle body 2 and each of the rear wheels 7 configures a driving wheel of the dump truck 1. As shown in FIG. 3, the rear wheels 7 are rotationally driven integrally with a wheel mounting tube 18 by a traveling drive device 11 which will be described later. Here, the rear wheel 7 is largely constituted by two tires 7A, 7A and two rims 7B which are axially arranged side by side on the inner periphery side of each tire 7A.

Figure 2:
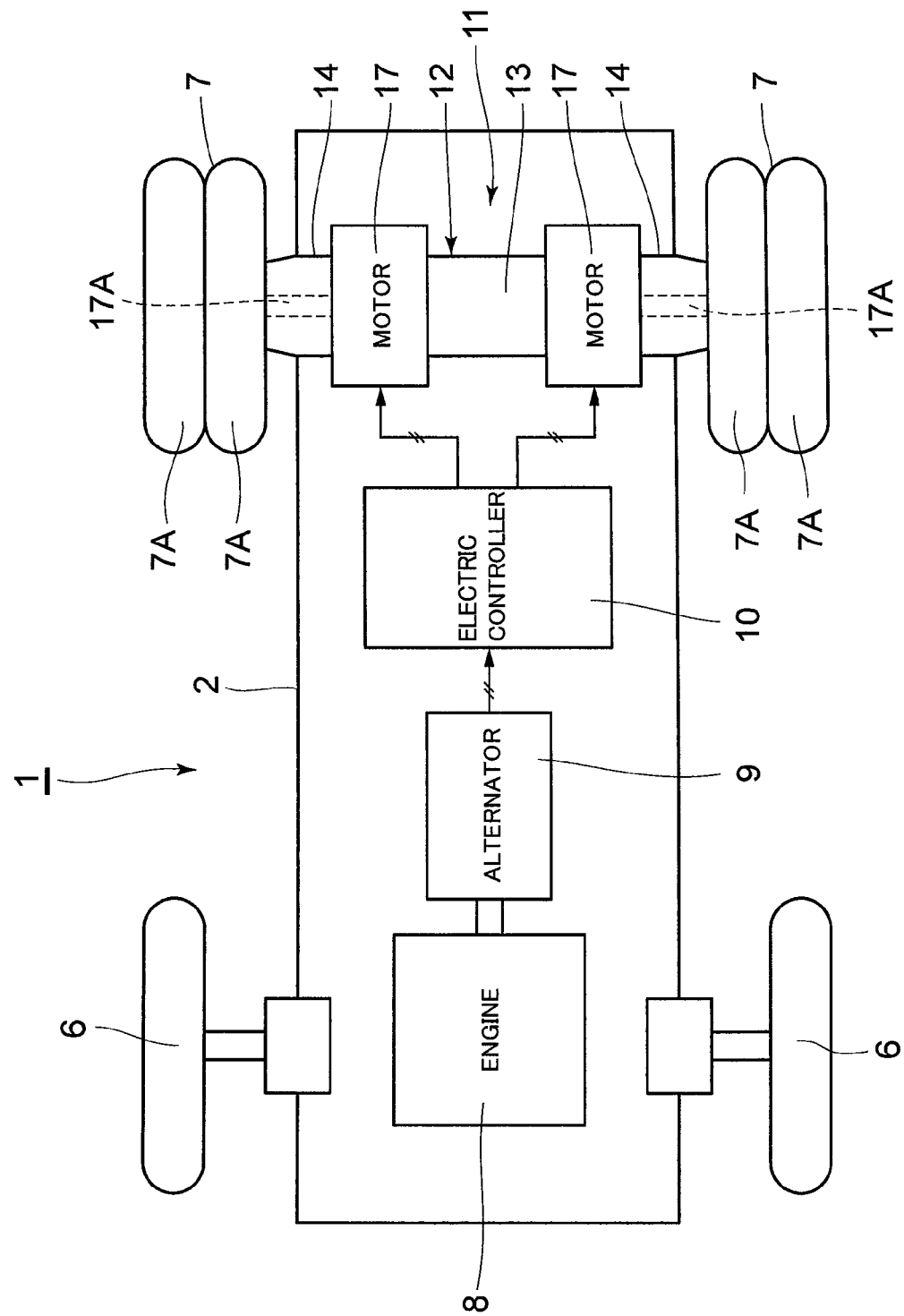
FIG. 2 is a configuration diagram showing a traveling drive device for dump truck.

Indicated at 8 is an engine as a prime mover which is located under the cabin 5 and is provided in the vehicle body 2. As shown in FIG. 2, the engine 8 is configured by, for example, a large diesel engine and is adapted to drive an alternator 9 as a generator. In addition, the engine 8 rotationally drives a hydraulic pump (not shown) which serves as a hydraulic power source, and the hydraulic pump delivers pressurized oil to the hoist cylinder 4, a steering cylinder (not shown) for power steering and the like.

Indicated at 10 is an electric controller which configures a control unit of the dump truck 1. As shown in FIG. 1, the electric controller 10 is configured by a switchboard and the like which are located on the rear side of the cabin 5 and are arranged upright on the vehicle body 2. The electric controller 10 charges a battery (not shown) with electricity generated by the alternator 9 shown in FIG. 2 and at the same time outputs the electricity to electric motors 17 which will be described later to individually feedback-control rotational speeds of the electric motors 17.

Next, a traveling drive device according to the first embodiment will be described.

Indicated at 11 is the traveling drive device which is provided on the rear wheel 7 side of the dump truck 1. The traveling drive device 11 is configured by including an axle housing 12, the electric motor 17, the wheel mounting tube 18 and a reduction mechanism 22, which will be described later. The traveling drive device 11 is adapted to decelerate rotation of the electric motor 17 by the reduction mechanism 22 and travelingly drive the rear wheel 7 which serves as the driving wheel of the vehicle together with the wheel mounting tube 18 with large torque of rotation.

Indicated at 12 is the axle housing for the rear wheel 7 which is provided on the rear side of the vehicle body 2 and the axle housing 12 is formed as a tubular body which axially extends between the left and right rear wheels 7, 7. Here, as shown in FIG. 2 and FIG. 3, the axle housing 12 is configured by an intermediate suspension tube 13 which is mounted to the rear side of the vehicle body 2 via a dumper (not shown) such as a shock absorber and the like and motor accommodating tubes 14 and tubular spindles 15 which are respectively provided on the left and right both sides of the suspension tube 13.

Indicated at 14 are the motor accommodating tubes as drive source accommodating portions which are provided on both of the left and right sides of the suspension tube 13. Each of the motor accommodating tubes 14 is formed as a tubular body which is tapered as shown in FIG. 3, and a part of the electric motor 17 which will be described later which serves as the drive source of the rear wheel 7 is accommodated therein. The axial inside of the motor accommodating tube 14 constitutes a large-diameter portion 14A and this large-diameter portion 14A side is detachably fixed to the suspension tube 13 by using bolts and the like. On the other hand, the axial outside (the side axially opposite to the electric motor 17) of the motor accommodating tube 14 constitutes a small-diameter portion 14B and a connecting portion 15B of the tubular spindle 15 which will be described later is detachably coupled (fixed) to this small-diameter portion 14B side via a plurality of bolts 16.

Indicated at 15 is the tubular spindle which configures a distal end side opening part of the axle housing 12. This tubular spindle 15 is constituted of a large-diameter stepped tubular body having an inner diameter dimension of, for example, about 80 to 100 cm. A first planetary gear reduction mechanism 23 which will be described later is accommodated on the inner periphery side of the tubular spindle 15. On the other hand, an outer peripheral surface of the tubular spindle 15 is configured to rotatably support the wheel mounting tube 18 which will be described later.

An annular projecting portion 15A which radially projects inward from its inner peripheral surface is integrally formed on an axial intermediate part of the tubular spindle 15. A first-stage carrier 27 which will be described later is fixedly mounted to this annular projecting portion 15A. The axial inside (the electric motor 17 side) of the tubular spindle 15 constitutes the connecting portion 15B and the connecting portion 15B is coupled to the small-diameter portion 14B of the motor accommodating tube 14 via the bolts 16.

On the other hand, an annular flange portion 15C which radially projects outward is integrally formed on the axial outside (the side axially opposite to the electric motor 17) of the tubular spindle 15. A final-stage carrier 35 which will be described later is fixedly mounted to this flange portion 15C. The carrier 27 of the first-stage planetary gear reduction mechanism 23 which will be described later and the carrier 35 of a second-stage planetary gear reduction mechanism 31 are fixed to the tubular spindle 15. Thereby, the tubular spindle 15 is assembled as a covered tubular body which makes up a rigid structure and supports the wheel mounting tube 18 from the inside on its outer periphery side with high rigidity (strength). On the other hand, the tubular spindle 15 receives reaction force of rotation and the like generated in the reduction mechanism 22 which will be described later (the planetary gear reduction mechanisms 23, 31) via the carriers 27, 35 with sufficient strength. Further, the inner periphery side of the tubular spindle 15 is charged with lubricating oil so as to lubricate the planetary gear reduction mechanisms 23, 31 which will be described later and the like with the lubricating oil.

Indicated at 17 is the electric motor as the drive source. The electric motor 17 is detachably mounted to the motor accommodating tube 14 of the axle housing 12. As shown in FIG. 2, the electric motors 17 are mounted respectively in the left and right motor accommodating tubes 14 independently of each other in order to rotationally drive the left and right rear wheels 7 independently of each other.

The electric motor 17 has a rotational shaft 17A which axially extends from the motor accommodating tube 14 into the tubular spindle 15. The rotational shaft 17A is rotationally driven forwardly or reversely by the electric motor 17. A sun gear 24 which will be described later is spline-coupled to the distal end side of the rotational shaft 17A.

Indicated at 18 is the wheel mounting tube which is rotatably provided on the outer periphery side of the tubular spindle 15. The rear wheel 7 is mounted to this wheel mounting tube 18 and the rim 7B of the rear wheel 7 is detachably mounted to the outer periphery side of the wheel mounting tube 18 by using a plurality of wedge-shaped clamp members 7C (see, FIG. 3). The wheel mounting tube 18 is configured by a tubular main body 19, a ring gear 33 and a disk holding cylinder 49 which will be described later.

Indicated at 19 is the tubular main body which configures a main body portion of the wheel mounting tube 18 and the tubular main body 19 comprises a cylindrical body which is thick as a whole. The tubular main body 19 is adapted to be rotatably supported on the tubular spindle 15 via wheel support bearings 20, 21 which will be described later. Here, a stepped bearing mounting portion 19A which is located on the electric motor 17 side and a stepped bearing mounting portion 19B which is located on the side which is axially opposite to the electric motor 17 are provided on the inner periphery side of the tubular main body 19.

Figure 4:
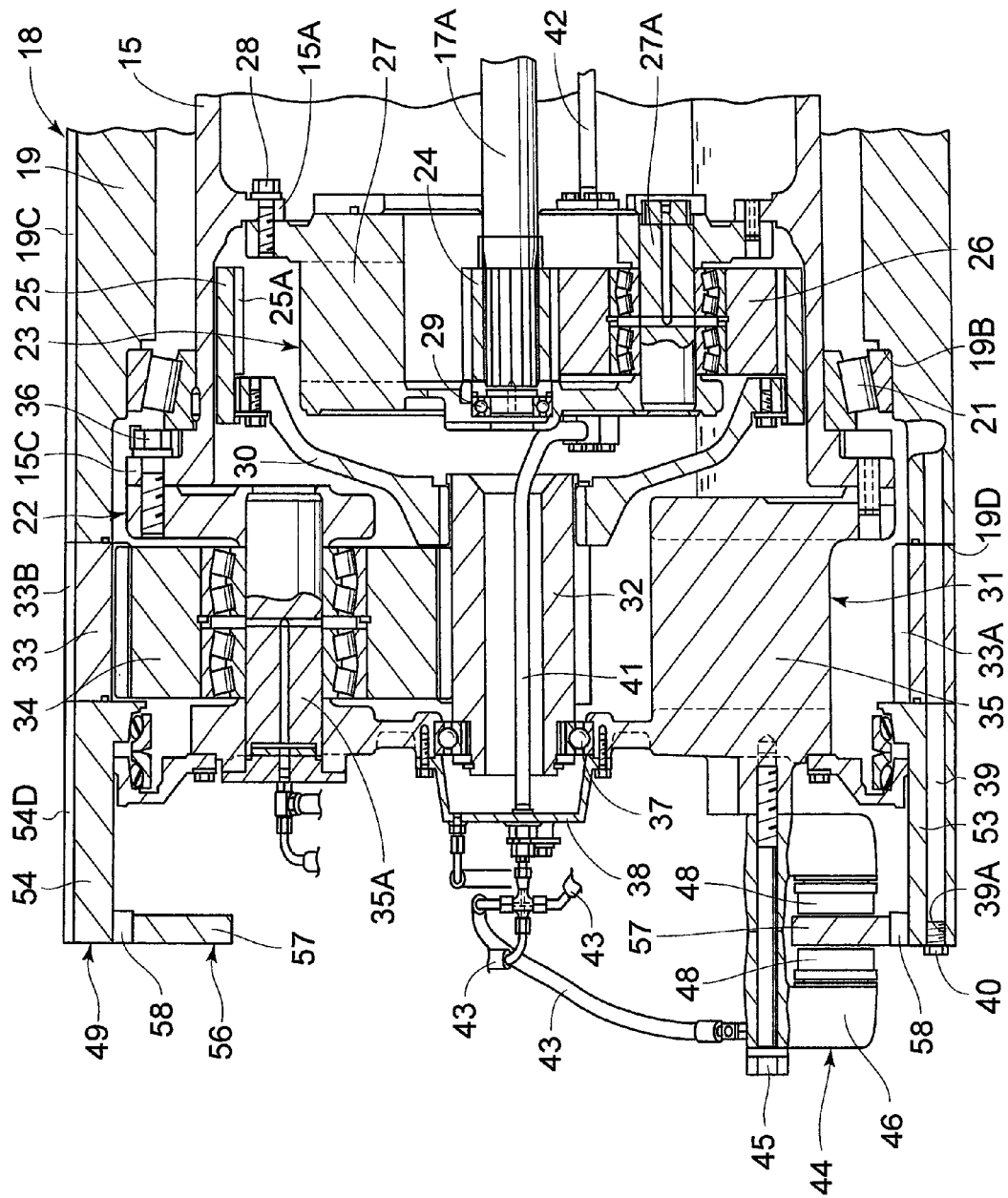
FIG. 4 is an enlarged sectional view showing a wheel mounting tube, a planetary gear reduction mechanism, a brake device and the like in FIG. 3 in an enlarged form.
Figure 5:
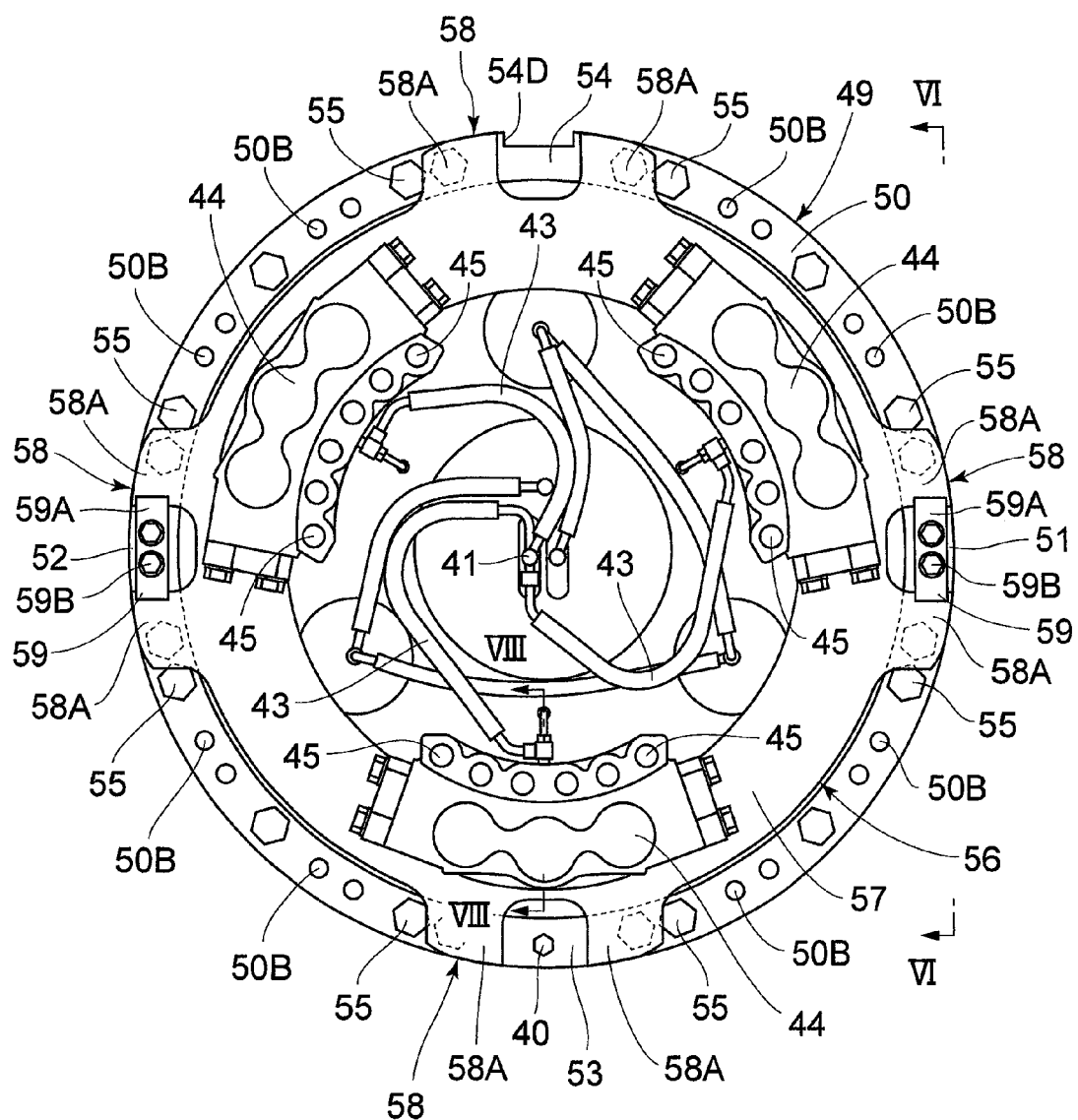
FIG. 5 is an enlarged view of essential parts showing the brake device, a brake disk and the like as viewed in the direction of arrows V-V in FIG. 3.
Figure 6:
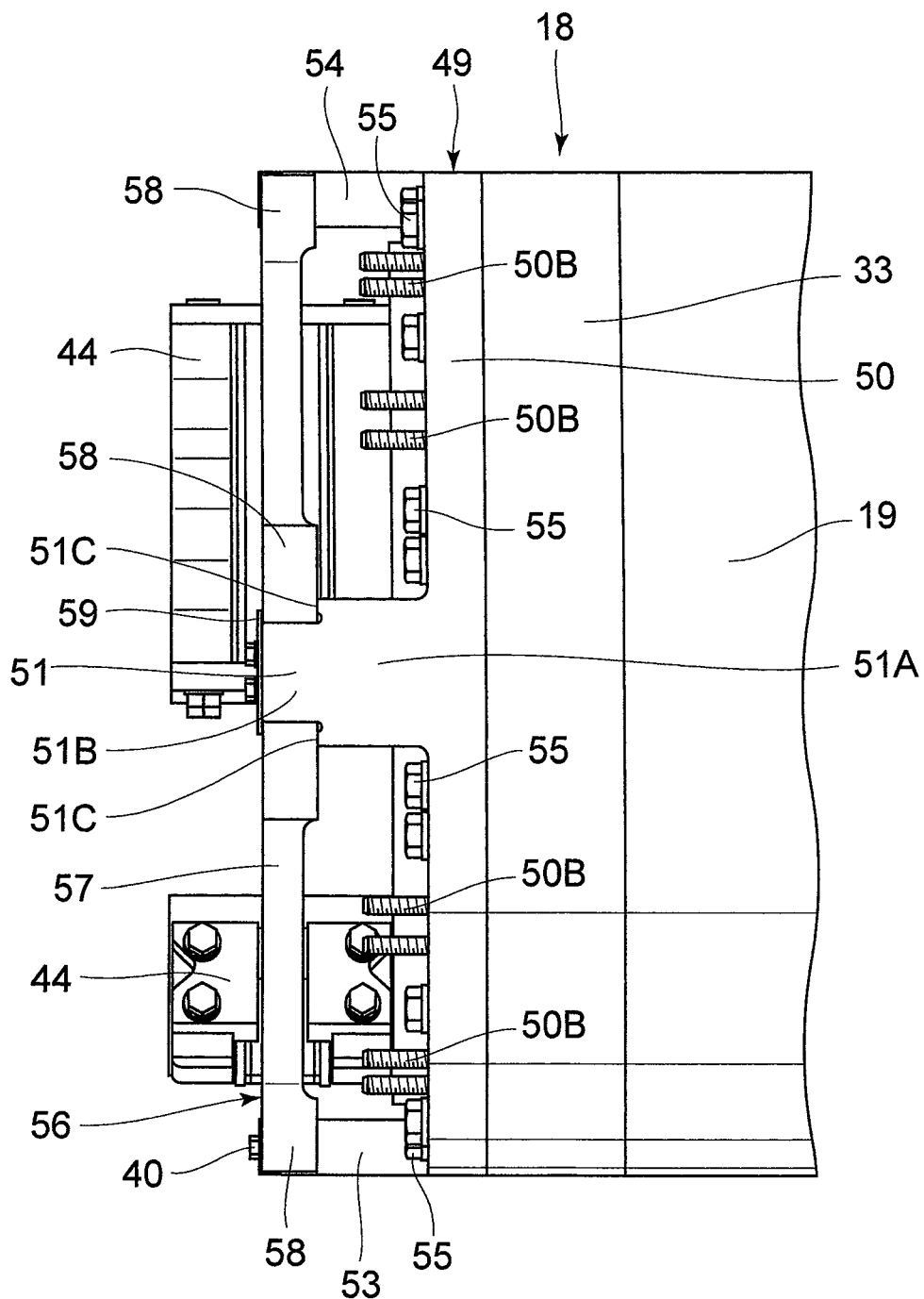
FIG. 6 is a side view of a disk holding cylinder, the brake disk, a brake device and the like as viewed in the direction of arrows VI-VI in FIG. 5.

On the other hand, a hose accommodating groove 19C is formed on the outer periphery side of the tubular main body 19 so as to axially extend (see, FIG. 4). An air hose (not shown) is accommodated in this hose accommodating groove 19C and air is supplied to the tire 7A of the rear wheel 7 through this air hose. Many female screw holes (not shown) are formed in an end surface 19D on the axial outside (the side which is axially opposite to the electric motor 17) of the tubular main body 19 circumferentially at intervals. Each of these female screw holes corresponds to each bolt through-hole 50A provided in a cylindrical body 50 of the disk holding cylinder 49 which will be described later.

Indicated at 20 and 21 are the wheel support bearings which are provided between the tubular spindle 15 of the axle housing 12 and the tubular main body 19 of the wheel mounting tube 18. These wheel support bearings 20, 21 rotatably support the tubular main body 19 on the outer periphery side of the tubular spindle 15. Here, each of the wheel support bearings 20, 21 is configured by using, for example, a tapered roller bearing. One wheel support bearing 20 is mounted to the bearing mounting portion 19B of the tubular main body 19 and the other wheel support bearing 21 is mounted to the bearing mounting portion 19B of the tubular main body 19.

Indicated at 22 is the reduction mechanism which is provided between the tubular spindle 15 of the axle housing 12 and the wheel mounting tube 18. The reduction mechanism 22 is configured by the first-stage planetary gear reduction mechanism 23 and the second-stage planetary gear reduction mechanism 31 which will be described later and are adapted to decelerate rotation of the rotational shaft 17A of the electric motor 17 for transmission to the wheel mounting tube 18 as shown in FIG. 4.

Indicated at 23 is the first-stage planetary gear reduction mechanism and the planetary gear reduction mechanism 23 is configured as a carrier fixing type reduction mechanism which is provided in the tubular spindle 15 of the axle housing 12. Here, the planetary gear reduction mechanism 23 is configured by the sun gear 24 which is spline-coupled to the distal end side of the rotational shaft 17A, a plurality of planetary gears 26 (only one of them is shown) each of which rotates on its axis in accordance with rotation of the sun gear 24 in engagement with the sun gear 24 and internal teeth 25A of a ring gear 25, and the carrier 27 which rotatably supports each of the planetary gears 26 via a support pin 27A.

The outer periphery side of the first-stage carrier 27 is fixed to the annular projecting portion 15A of the tubular spindle 15 in a non-rotational state by using a plurality of bolts 28. On the other hand, a bearing 29 which is rotatably adapted to axially position the distal end side of the rotational shaft 17A is provided on the inner periphery side of the carrier 27. The first-stage ring gear 25 radially surrounds the sun gear 24, the planetary gear 26, the support pin 27A, the carrier 27 and the like from the outside and the internal teeth 25A which engage with the planetary gear 26 are formed on its inner periphery side. The ring gear 25 is relatively rotatably disposed on the inner periphery side of the tubular spindle 15, leaving a small radial gap (for example, about 2 to 5 mm).

In the first-stage planetary gear reduction mechanism 23, revolution (rotation of the carrier 27) of the planetary gear 26 is restricted by fixing the carrier 27 to the tubular spindle 15. Therefore, when the sun gear 24 is rotated by the rotational shaft 17A of the electric motor 17, the first-stage planetary gear reduction mechanism 23 converts the rotation of the sun gear 24 into autorotation of the plurality of planetary gears 26. Thereby, the first-stage planetary gear reduction mechanism 23 takes out the autorotation (rotation) of each planetary gear 26 as decelerated rotation of the ring gear 25 and transmits it to the second-stage planetary gear reduction mechanism 31 via a coupling 30.

Indicated at 30 is the coupling which rotates integrally with the first-stage ring gear 25. The coupling 30 is formed as an annular plate body which is located between the first-stage planetary gear reduction mechanism 23 and the second-stage planetary gear reduction mechanism 31. The outer periphery side of the coupling 30 is coupled to the first-stage ring gear 25 by using means such as spline coupling and the like. On the other hand, the inner periphery side of the coupling 30 is coupled to a second-stage sun gear 32 which will be described later by using means such as spline coupling and the like. Thereby, the coupling 30 transmits the rotation of the first-stage ring gear 25 to the second-stage sun gear 32 to rotate the sun gear 32 integrally with the ring gear 25 at the same speed.

Indicated at 31 is the second-stage planetary gear reduction mechanism which constitutes the final stage. The planetary gear reduction mechanism 31 is disposed between the tubular spindle 15 and the wheel mounting tube 18 via the first-stage planetary gear reduction mechanism 23. The planetary gear reduction mechanism 31 decelerates the rotation of the rotational shaft 17A of the electric motor 17 together with the first-stage planetary gear reduction mechanism 23 to make the wheel mounting tube 18 generate large torque of rotation.

The planetary gear reduction mechanism 31 is disposed coaxially with the rotational shaft 17A and is configured by the tubular sun gear 32 which rotates integrally with the coupling 30, a plurality of planetary gears 34 (only one of them is shown) each of which engages with the sun gear 32 and internal teeth 33A of the ring gear 33 and rotates on its axis in accordance with rotation of the sun gear 32 and a carrier 35 which rotatably supports each of the planetary gears 34 via a support pin 35A.

Here, the outer periphery side of the second-stage carrier 35 is fixed to the flange portion 15C of the tubular spindle 15 in a non-rotational state by using a bolt 36. Thereby, the carrier 35 also serves as a lid body for covering an axial outer opening end of the tubular spindle 15. A bearing 37 is provided on the inner periphery side of the carrier 35 and the bearing 37 rotatably supports the sun gear 32 between it and the coupling 30 from the axial both sides.

On the other hand, the second-stage ring gear 33 surrounds the sun gear 32, the planetary gear 34, the support pin 35A, the carrier 35 and the like radially from the outside and the internal teeth 33A which engage with each planetary gear 34 are formed on its inner periphery side. The ring gear 33 configures a part of the wheel mounting tube 18 and is fixed to the axial outer end surface 19D of the tubular main body 19 together with the disk holding cylinder 49 which will be described later. Therefore, the outer-diameter dimension of the ring gear 33 is set generally equal to the outer-diameter dimension of the tubular main body 19 and the disk holding cylinder 49 which will be described later.

Many bolt through-holes (not shown) are axially provided through an axial end face of the ring gear 33 and each of these bolt through-holes corresponds to each of the bolt through-holes 50A provided through the cylindrical body 50 of the disk holding cylinder 49 which will be described later. An axially extending hose accommodating groove 33B is formed on the outer periphery side of the ring gear 33 and the hose accommodating groove 33B is seriated with the hose accommodating groove 19C in the tubular main body 19.

In the second-stage planetary gear reduction mechanism 31, revolution (rotation of the carrier 35) of the planetary gear 34 is restricted by fixing the carrier 35 to the tubular spindle 15. Therefore, when the sun gear 32 rotates integrally with the coupling 30, the second-stage planetary gear reduction mechanism 31 converts the rotation of the sun gear 32 into autorotation of the plurality of planetary gears 34. As a result, the planetary gear reduction mechanism 31 takes out the autorotation (rotation) of each planetary gear 34 as decelerated rotation from the ring gear 33.

The ring gear 33 configures a part of the wheel mounting tube 18 on the rear wheel 7 side and therefore has the configuration that the large torque of rotation which is subjected to two-stage speed reduction by the first-stage planetary gear reduction mechanism 23 and the second-stage planetary gear reduction mechanism 31 can be transmitted to the wheel mounting tube 18.

An inner cap 38 is detachably provided on the inner periphery side of the second-stage carrier 35 via bolts and the like. The inner cap 38 holds the bearing 37 between it and the carrier 35 in a retaining state. On the other hand, the inner cap 38 caps the opening end side of the tubular spindle 15 together with the carrier 35 to prevent leakage of the lubricating oil filled in the tubular spindle 15 from the inner periphery side of the carrier 35.

A drain hole 39 is formed on the outermost periphery side of the wheel mounting tube 18. As shown in FIG. 4, the drain hole 39 axially extends along the tubular main body 19, passing through the disk holding cylinder 49 which will be described later and the ring gear 33 and leads into the wheel mounting tube 18 in the vicinity of the wheel support bearing 21. On the other hand, the drain hole 39 opens to the outside from a distal end portion of a disk mounting leg 53 which will be described later and this opening end 39A is closed with a plug (a sealing plug) 40. Therefore, the lubricating oil retained in the wheel mounting tube 18 can be discharged to the outside through the drain hole 39 by removing the plug 40.

Indicated at 41 is a brake pipe which is disposed so as to axially extend in the tubular sun gear 32 and the brake pipe 41 is drawn out to the outside through the inner cap 38. The vessel end side of the brake pipe 41 extends toward the first-stage carrier 27 and is connected to the other brake pipe 42 through an axial liquid hole (not shown) and the like which is bored in the first-stage carrier 27.

As shown in FIG. 3, the other brake pipe 42 axially extends through within the tubular spindle 15. The vessel end side of the other brake pipe 42 is connected to a master cylinder via a liquid pressure control valve for braking and the like (none of them is shown) which is mounted on the vehicle body 2. At the braking of the dump truck 1, brake liquid pressure from the said master cylinder is supplied from the brake pipe 42 toward the brake pipe 41.

On the other hand, the distal end side of the brake pipe 41 which is drawn out to the outside through the inner cap 38 is connected to three branch pipes 43 which are configured by flexible hoses and the like. Each of these branch pipes 43 supplies the brake liquid pressure which is supplied from the brake pipe 41 side to each of brake devices 44 which will be described later.

Next, indicated at 44 are the plurality of brake devices for applying braking forces to the wheel mounting tube 18. Each of the brake devices 44 is configured by a dry condition disk brake and three units in total are provided at intervals in a circumferential direction of a brake disk 56 which will be described later. Each brake device 44 is mounted to the carrier 35 of the second-stage planetary gear reduction mechanism 31 which constitutes the final stage one by using a plurality of bolts 45.

Figure 8:
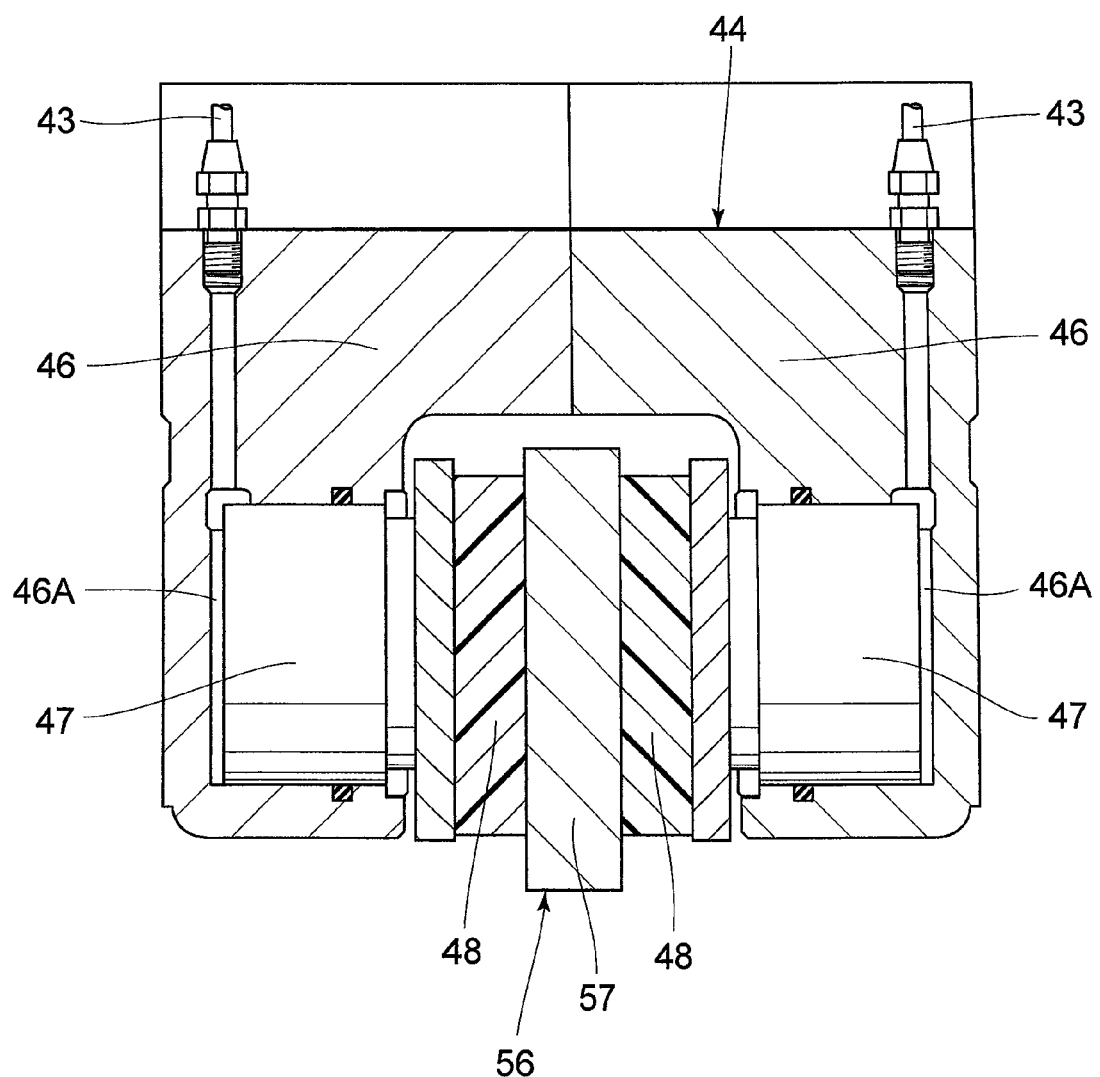
FIG. 8 is a sectional view of the brake device as viewed in the direction of arrows VIII-VIII in FIG. 5.

As shown in FIG. 8, the brake devices 44 are arranged with the brake disk 56, which will be described later, interposed and each is configured by a caliper 46 formed with a plurality cylinders 46A on a face facing the brake disk 56, a plurality of pistons 47 which are slidably inserted and fitted into the respective cylinders 46A of the caliper 46 and one pair of friction pads 48 which are pressed on the both faces of the brake disk 56 by the respective pistons 47.

The brake device 44 slides each piston 47 toward the brake disk 56 in accordance with supply of the brake liquid pressure to the cylinder 46A of the caliper 46 via the brake pipes 41, 42 and each branch pipe 43. Thereby, the friction pads 48 which are pressed by the respective pistons 47 are pressed against the both faces of the brake disk 56 and the braking force is applied to the wheel mounting tube 18 which rotates integrally with the brake disk 56.

Next, the disk holding cylinder and the brake disk used in the first embodiment will be described in detail.

Figure 10:
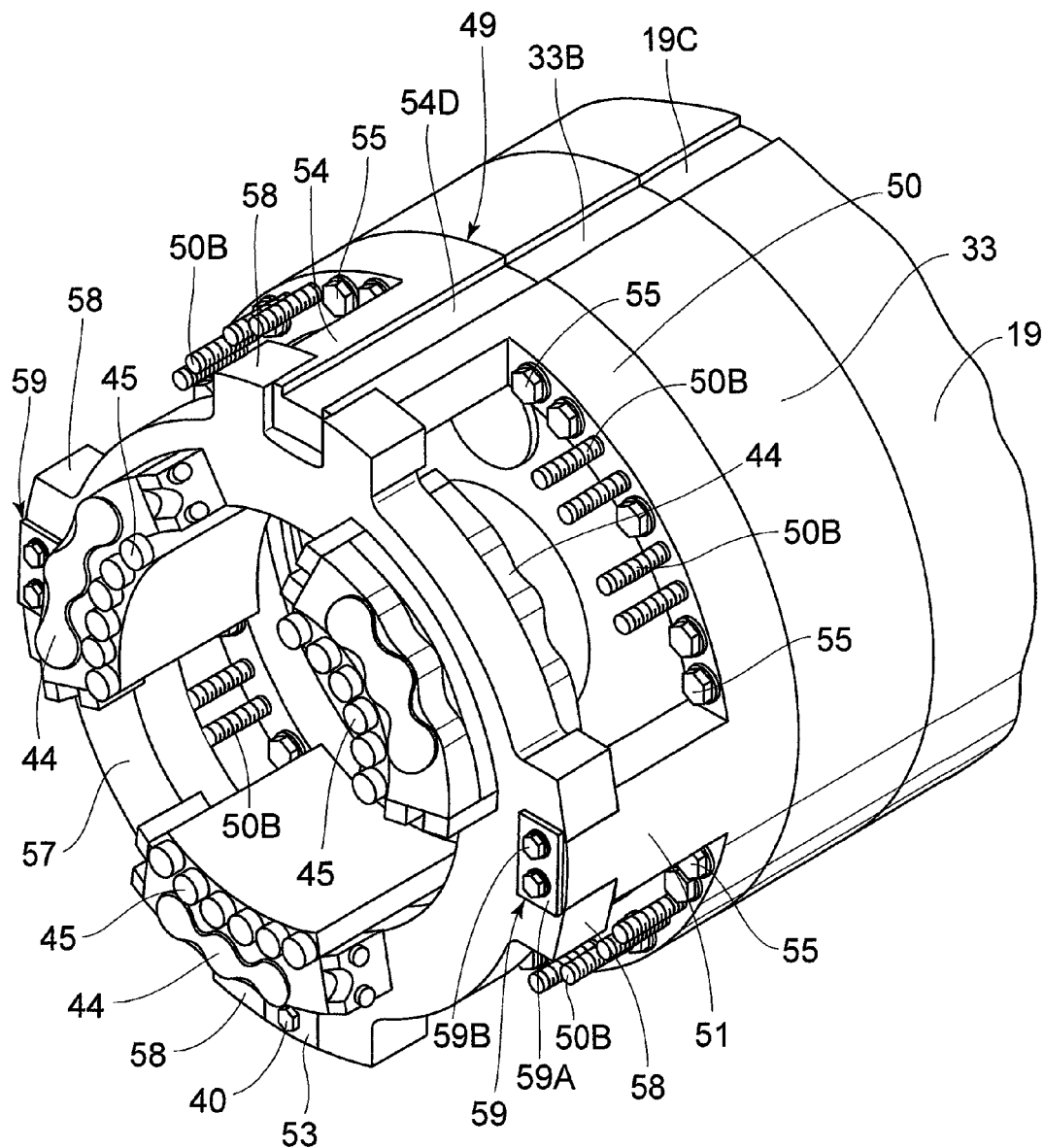
FIG. 10 is a perspective view showing the disk holding cylinder, the brake disk, the brake device and the like in an assembled state.
Figure 11:
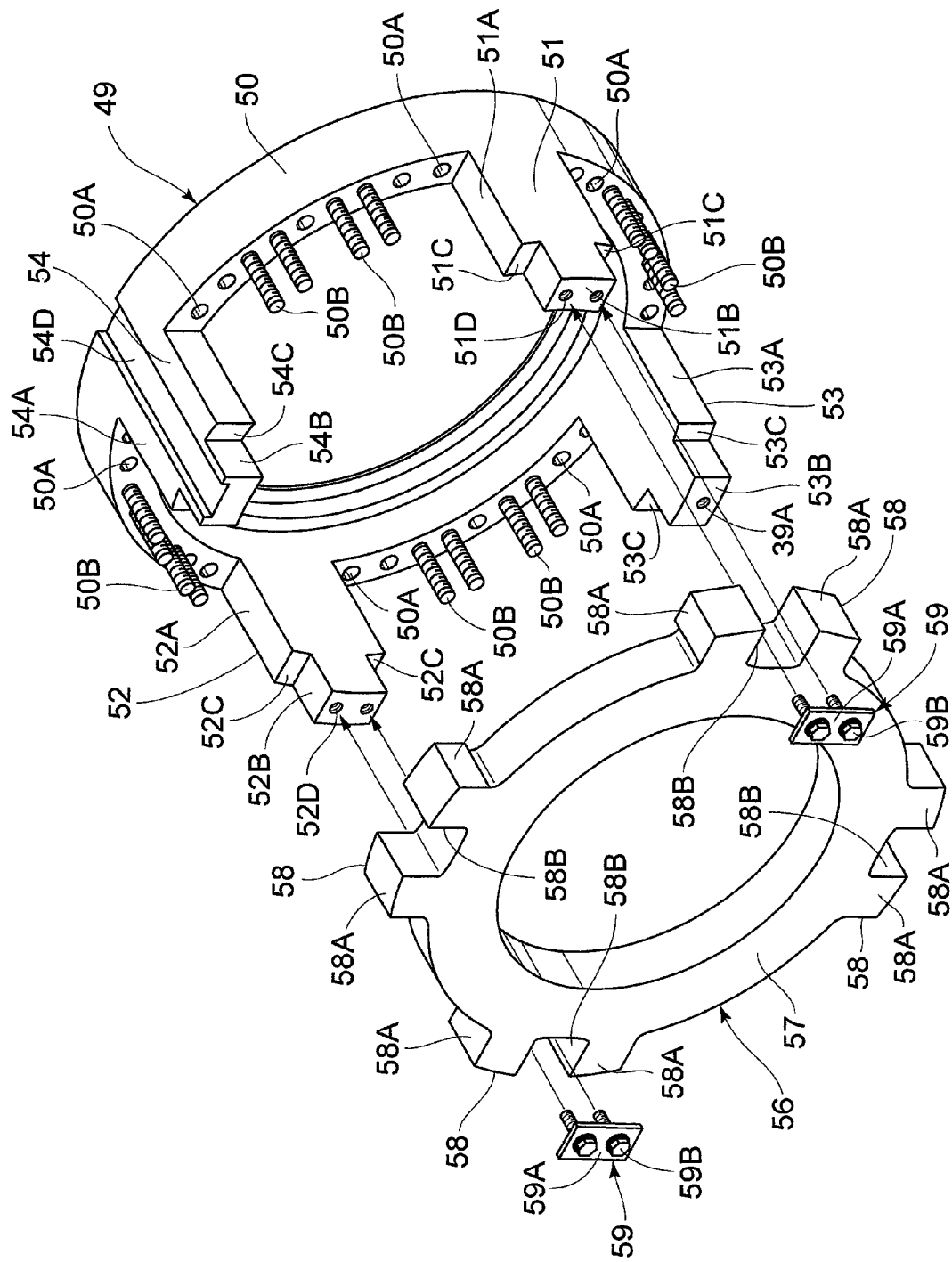
FIG. 11 is an exploded perspective view showing the disk holding cylinder and the brake disk.
Figure 12:
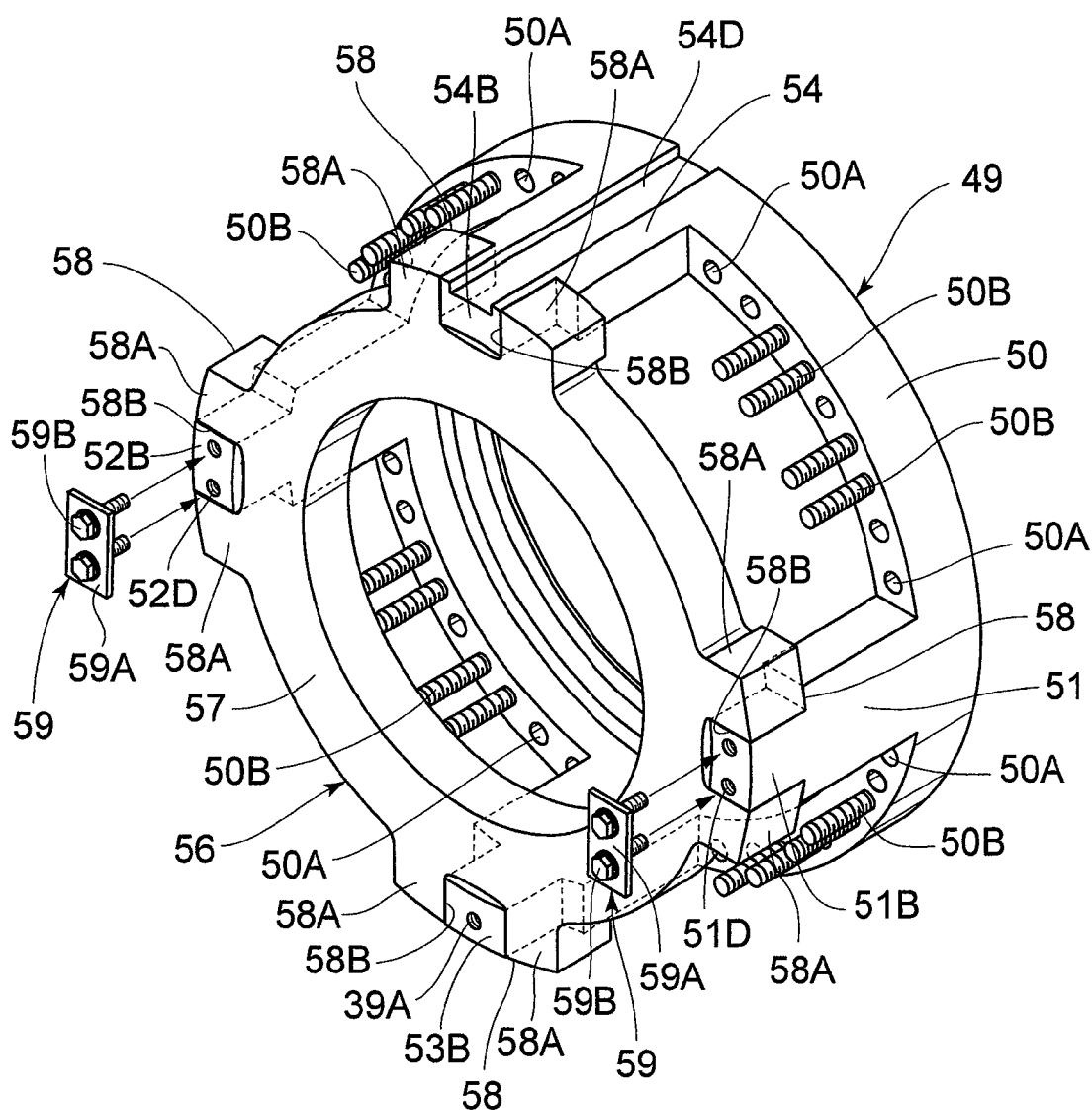
FIG. 12 is a perspective view showing a state that the brake disk is assembled to the disk holding cylinder.

Designated at 49 is the disk holding cylinder which is arranged on the axial outside of the wheel mounting tube 18 which is the side opposite to the electric motor 17. The disk holding cylinder 49 is adapted to hold the brake disk 56 which will be described later and configures apart of the wheel mounting tube 18 together with the ring gear 33. As shown in FIG. 10 to FIG. 12, the disk holding cylinder 49 is configured by the cylindrical body 50 and a plurality (for example, four) of disk mounting legs 51, 52, 53, 54 which will be described later.

Indicated at 50 is the cylindrical body which configures a part of the wheel mounting tube 18. The cylindrical body 50 comprises a short cylindrical body having an outer-diameter dimension which is generally equal to those of the tubular main body 19 and the ring gear 33. The plurality of bolt through-holes 50A are axially provided through an axial end face of the cylindrical body 50. Each of these bolt through-holes 50A corresponds to a bolt through-hole bored in the ring gear 33 and a female screw hole (none of them is shown) threaded in the end surface 19D of the tubular main body 19. A plurality of stud bolts 50B used for mounting the clamp member 7C shown in FIG. 3 are axially provided in a protruded form on an axial end face of the cylindrical body 50.

A long bolt 55 is inserted into each bolt through-hole 50A in the cylindrical body 50 and the long bolt 55 is threaded into a female screw hole (not shown) which is bored in the end surface 19D of the tubular main body 19 after having been inserted into a bolt through-hole (not shown) in the ring gear 33. Thereby, the wheel mounting tube 18 that the tubular main body 19, the ring gear 33 and the disk holding cylinder 49 are integrated by using the long bolt 55 is formed.

Designated at 51, 52, 53, 54 are the four disk mounting legs which axially project outward from the cylindrical body 50. The brake disk 56 which will be described later is mounted to the distal end (a projected end) of each of the disk mounting legs 51, 52, 53, 54. The respective disk mounting legs 51, 52, 53, 54 are arranged at angular intervals of 90 degrees in a circumferential direction of the cylindrical body 50 and are formed integrally with the cylindrical body 50.

In this case, since the respective disk mounting legs 51, 52, 53, 54 have substantially the same outer shape, the disk mounting leg 51 will be hereinafter described by way of example.

Figure 7:
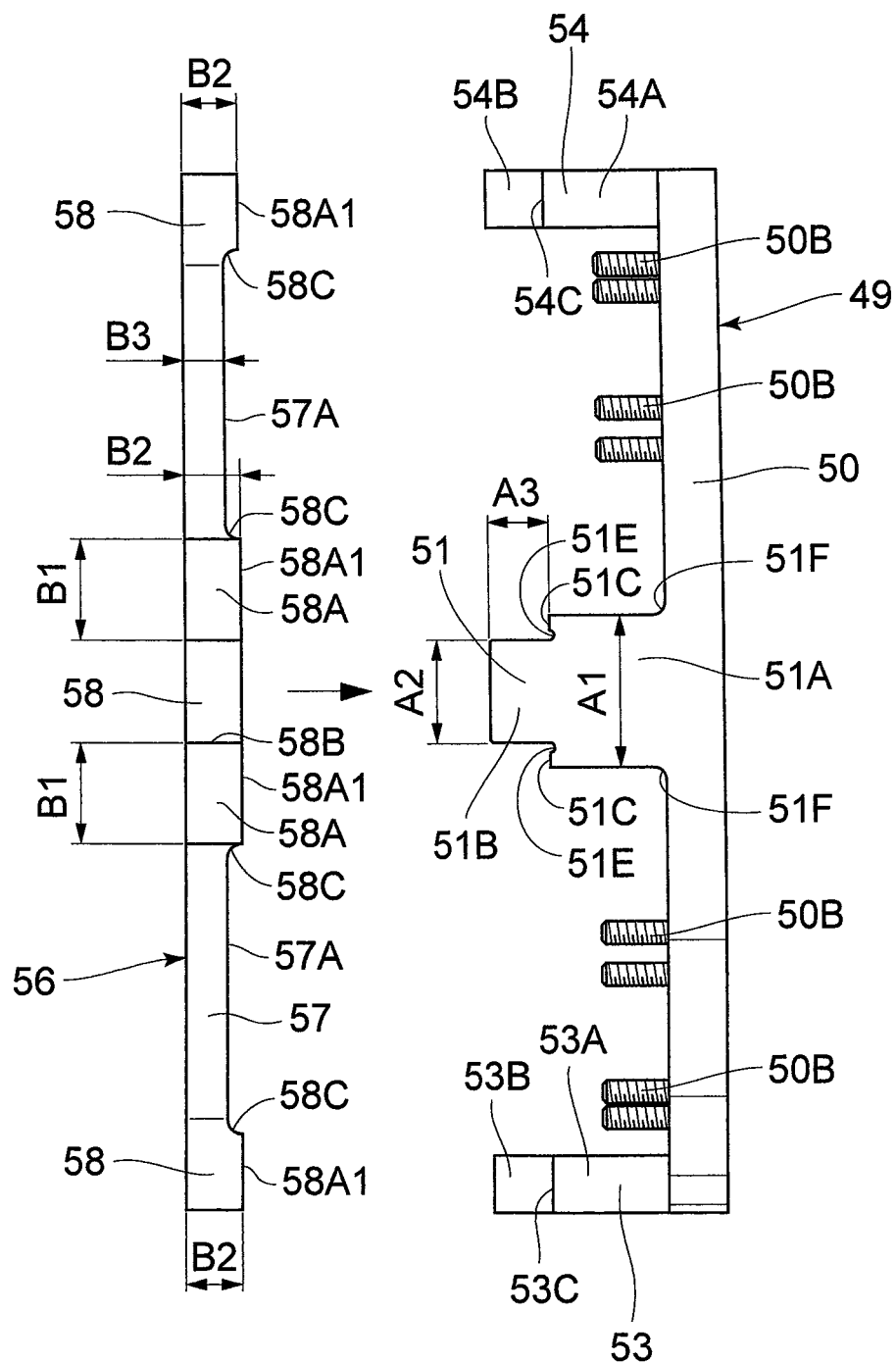
FIG. 7 is a side view showing the disk holding cylinder and the brake disk in FIG. 6 in an exploded state.
Figure 9:
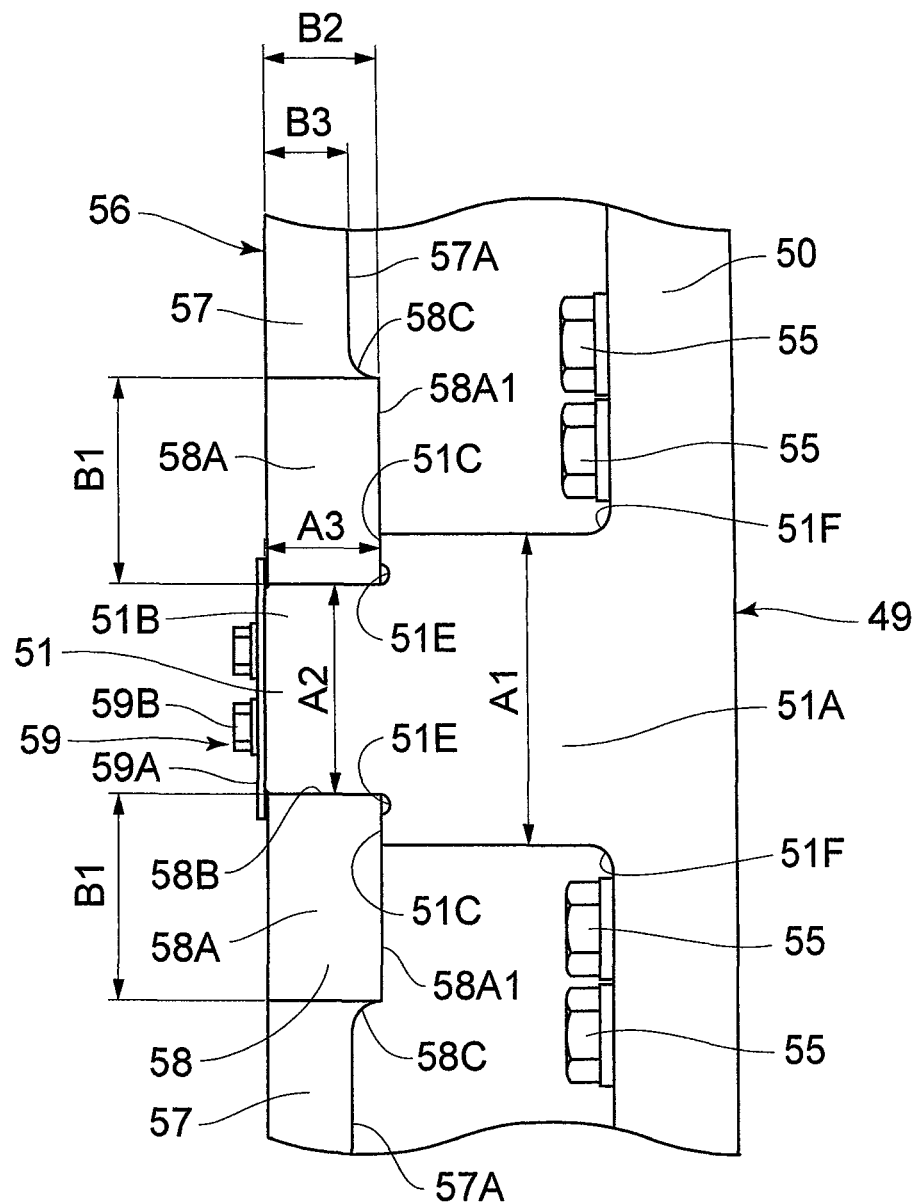
FIG. 9 is an enlarged view of essential parts showing essential parts of the disk mounting leg, a U-shaped projection and the like in FIG. 6 in an enlarged form.

The disk mounting leg 51 is configured by an arc-shaped platform 51A which is axially projected from the cylindrical body 50, a recessed groove fitting projection 513 which is provided on the distal end side of the platform 51A and onto which a recessed groove 58B of the brake disk 56 which will be described later is to be fitted and a stepped portion 51C which is provided between the platform 51A and the recessed groove fitting projection 51B. As shown in FIG. 7 and FIG. 9, a circumferential length dimension A1 of the platform 51A is set longer than a circumferential length dimension A2 of the recessed groove fitting projection 51B. The recessed groove fitting projection 51B is arranged on a circumferential intermediate part of the disk mounting leg 51 and the stepped portion 51C is formed as two flat surfaces which circumferentially hold the recessed groove fitting projection 51B therebetween. A thickness dimension A3 of the recessed groove fitting projection 51B is set generally equal to or slightly larger than a thickness dimension B2 of a U-shaped projection 58 of the brake disk 56 which will be described later.

As shown in FIG. 9, the brake disk 56 is axially positioned by holding the recessed groove fitting projection 51B in a circumferential direction by the U-shaped projection 58 of the brake disk 56 which will be described later and bringing the U-shaped projection 58 into abutment against the stepped portion 51C. Incidentally, the number of the long bolts 55 to be inserted into the cylindrical body 50 is defined to a fixed number in order to firmly mount the disk holding cylinder 49 to the tubular main body 19. Therefore, the circumferential length dimension A1 of the disk mounting leg 51 (the platform 51A) is set to a maximum length dimension within a range not interfering with the long bolt 55.

In the recessed groove fitting projection 51B, heat treatment such as quenching and the like is performed on a face which is in contact with the U-shaped projection 58 of the brake disk 56. Thereby, friction of the recessed groove fitting projection 51B caused by contact with the U-shaped projection 58 can be suppressed. Two female screw holes 51D are formed in a distal end surface of the recessed groove fitting projection 51B at intervals circumferentially.

Arc-shaped step side arcuate portions 51E which smoothly seriate the both with each other are provided on two corner parts (the roots of the recessed groove fitting projection 51B) where the recessed groove fitting projection 51B and the stepped portion 51C meet. Further, arc-shaped cylindrical body side arcuate portions 51E which smoothly seriate the both with each other are provided on two corner parts (the roots of the disk mounting leg 51) where the cylindrical body 50 and the platform 51A of the disk mounting leg 51 meet. This results in the configuration that a sudden change in shape does not occur between the cylindrical body 50 and the disk mounting leg 51 and concentration of stress on the corner part where the both meet can be suppressed.

On the other hand, also the disk mounting leg 52 which is circumferentially arranged together with the disk mounting leg 51 at intervals of 180 degrees has a platform 52A, a recessed groove fitting projection 52B and a stepped portion 52C similarly to the disk mounting leg 51. Two female screw holes 52D are formed in a distal end face of the recessed groove fitting projection 52B. Arc-shaped arcuate portions are respectively provided on a corner part where the recessed groove fitting projection 52B and the stepped portion 52C meet and a corner part where the cylindrical body 50 and the platform 52A of the disk mounting leg 52 meet.

Also the disk mounting leg 53 which is circumferentially arranged together with the disk mounting leg 51 at intervals of 90 degrees has a platform 53A, a recessed groove fitting projection 53B and a stepped portion 53C similarly to the disk mounting leg 51. Arc-shaped arcuate portions are respectively provided on a corner part where the recessed groove fitting projection 53B and the stepped portion 53C meet and a corner part where the cylindrical body 50 and the platform 53A of the disk mounting leg 53 meet. The opening end 39A of the above-mentioned drain hole 39 is arranged on a distal end face of the recessed groove fitting projection 53B.

On the other hand, also the disk mounting leg 54 which is circumferentially arranged together with the disk mounting leg 53 at intervals of 180 degrees has a platform 54A, a recessed groove fitting projection 54B and a stepped portion 54C similarly to the disk mounting leg 51. Arc-shaped arcuate portions are respectively provided on a corner part where the recessed groove fitting projection 54B and the stepped portion 54C meet and a corner part where the cylindrical body 50 and the platform 54A of the disk mounting leg 54 meet. A hose accommodating groove 54D is formed in an outer peripheral surface of the disk mounting leg 54 so as to axially extend. This hose accommodating groove 54D has a width dimension which is smaller than the circumferential length dimension A2 of the recessed groove fitting projection 54B and is seriated with the hose accommodating groove 33B in the ring gear 33 (see, FIG. 4).

Indicated at 56 is the brake disk and the brake disk 56 is mounted to the disk holding cylinder 49 which is located on the axial outside of the wheel mounting tube 18. The brake disk 56 rotates integrally with the wheel mounting tube 18 and the friction pad 48 is pressed against it when braking by the brake device 44. As shown in FIG. 10 to FIG. 12, the brake disk 56 is configured by a friction pad abutting ring 57 having an outer-diameter dimension which is generally equal to an inner-diameter dimension of the cylindrical body 50 of the disk holding cylinder 49 and the plurality (for example, four) of U-shaped projections 58 which will be described later.

Designated at 58 are the four U-shaped projections which are provided on an outer peripheral edge of the friction pad abutting ring 57 and the respective U-shaped projections 58 correspond to the respective disk mounting legs 51, 52, 53, 54 of the disk holding cylinder 49. These respective U-shaped projections 58 are arranged at angular intervals of 90 degrees in a circumferential direction of the friction pad abutting ring 57 and are integrally formed so as to radially project from the outer peripheral edge of the friction bad abutting ring 57. Each U-shaped projection 58 is formed into a U-shape by one pair (two) of engaging pawls 58A which are circumferentially arranged at intervals and a recessed groove 58B is formed between the respective engaging pawls 58A. The recessed is grooves 58B have a circumferential length dimension (a groove width) which is slightly larger than the circumferential length dimension A2 of the recessed groove fitting projections 51B, 52B, 53B, 54B of the disk mounting legs 51, 52, 53, 54 and fit on the recessed groove fitting projections 51B, 52B, 53B, 54B of the disk mounting legs 51, 52, 53, 54 so as to hold them in the circumferential direction.

As shown in FIG. 7 and FIG. 9, a circumferential length dimension B1 of each engaging pawl 58A which configures the U-shaped projection 58 is set to a length which is equal to the circumferential length dimension A2 of the recessed groove fitting projection 51B which is provided on the disk mounting leg 51. Thereby, the circumferential sectional area of the U-shaped projection 58 can be increased. On the other hand, the thickness dimension B2 of the U-shaped projection 58 is set larger than a thickness dimension B3 of the friction pad abutting ring 57 and generally equal to or slightly smaller than the thickness dimension A3 of the recessed groove fitting projection 51B of the disk mounting leg 51. Thereby, the contact areas of the respective disk mounting legs 51, 52, 53, 54 of the disk holding cylinder 49 with the U-shaped projections 58 of the brake disk 56 can be increased.

Here, the center in the thickness direction (the axial direction) of each U-shaped projection 58 which configures the brake disk 56 deviates from the center in the thickness direction (the axial direction) of the friction pad abutting ring 57 toward the disk holding cylinder 49 side. An outer surface which is located on the axial outside of the engaging pawl 58A of each U-shaped projection 58 forms the same plane as an external face which is located on the axial outside of the friction pad abutting ring 57. On the other hand, the axial inside of the engaging pawl 58A constitutes an inner surface 58A1 which faces the cylindrical body 50 of the disk holding cylinder 49 and the axial inside of the friction pad abutting ring 57 constitutes an inner surface 57A which faces the cylindrical body 50. Here, the inner surface 58A1 of each engaging pawl 58A is projected more inward (the disk holding cylinder 49 side) than the inner surface 57A of the friction pad abutting ring 57. Therefore, the arc-shaped disk side arcuate portion 58C is provided on a corner part where the inner surface 57A of the friction pad abutting ring 57 and the inner surface 58A1 of each U-shaped projection 58 meet. This results in the configuration that a sudden change in shape does not occur between the inner surface 57A of the friction pad abutting ring 57 and the inner surface 58A1 of the U-shaped projection 58 and concentration of the stress on the corner part where the both meet can be suppressed.

In the first embodiment, the respective engaging pawls 58A of the U-shaped projections 58 can hold the recessed groove fitting projections 51B, 52B, 53B, 54B of the disk mounting legs 51, 52, 53, 54 therebetween in the circumferential direction. In this case, since the circumferential length dimension B1 of each engaging pawl 58A can be set large in accordance with the shape of the U-shaped projection 58, the circumferential sectional area of the U-shaped projection 58 can be increased and thus the bending strength of each engaging pawl 58A can be increased. On the other hand, since the thickness dimension B2 of the U-shaped projection 58 is set larger than the thickness dimension B3 of the friction pad abutting ring 57, the contact area between each of the disk mounting legs 51, 52, 53, 54 of the disk holding cylinder 49 and the U-shaped projection 58 can be increased. Thereby, the load which acts from each of the disk mounting legs 51, 52, 53, 54 of the disk holding cylinder 49 at braking is applied to the wheel mounting tube 18 by the brake device 44 can be reliably received by each U-shaped projection 58 of the brake disk 56.

Designated at 59 are two disk fixing members. The respective disk fixing members 59 are provided between the recessed groove fitting projections 51B, 52B of the disk mounting legs 51, 52 and the U-shaped projections 58 of the brake disk 56 and the respective disk fixing members 59 are adapted to axially fix the U-shaped projections 58 of the brake disk 56 to the disk mounting legs 51, 52. As shown in FIG. 9, the disk fixing member 59 is configured by a rectangular fixing plate 59A having a length dimension which is larger than the circumferential length dimension A2 of the recessed groove fitting projection 51B of the disk mounting leg 51 and two bolts 59B for fixing the fixing plate 59A to the disk mounting legs 51, 52.

Here, describing about one disk fixing member 59 to be mounted to the disk mounting leg 51, the two bolts 59B are inserted into the fixing plate 59A and the bolts 59B are screwed into the female screw holes 51D provided in the recessed groove fitting projection 51B of the disk mounting leg 51. Thereby, one disk fixing member 59 can hold the U-shaped projection 58 between the stepped portion 51C of the disk mounting leg 51 and the fixing plate 59A. With respect to the other disk fixing member 59 to be mounted to the disk mounting leg 52, the two bolts 59B which are inserted into the fixing plate 59A are screwed into the female screw holes 52D provided in the recessed groove fitting projection 52B of the disk mounting leg 52 similarly. Thereby, the other disk fixing member 59 can hold the U-shaped projection 58 between the stepped portion 52C of the disk mounting leg 52 and the fixing plate 59A. Thereby, the brake disk 56 is axially fixed to the disk mounting legs 51, 52, 53, 54 in a state of leaving the recessed grooves 58 of the respective U-shaped projections 58 fitted on the recessed groove fitting projections 51B, 52B, 53B, 54B of the disk mounting legs 51, 52, 53, 54.

The traveling drive device 11 for the dump truck 1 according to the first embodiment has such a configuration as mentioned above and hereinafter, the operation thereof will be described.

When the driver who has gotten into the cabin 5 of the dump truck 1 starts the engine 8, the hydraulic pump (not shown) which serves as the hydraulic power source is rotationally driven. On the other hand, electricity is generated by the alternator 9 and the electricity is supplied to the electric controller 10.

Thereby, a driving current is supplied from the electric controller 10 to the electric motor 17 on the rear wheel 7 side and the rotational shaft 17A is rotated. The rotation of the rotational shaft 17A is transmitted to the wheel mounting tube 18, having a large torque by being subjected to two-stage speed reduction by the planetary gear reduction mechanisms 23, 31. Thereby, the rear wheel 7 mounted to the wheel mounting tube 18 can be rotationally driven at large torque of rotation, thereby making it possible to travel the heavy dump truck 1.

On the other hand, in a case where the moving dump truck 1 is to be stopped, the driver performs the braking operation and thereby the brake fluid pressure is supplied to the cylinder 46A of the caliper 46 which configures the brake device 44 via the brake pipes 41, 42 and the respective branch pipes 43. Thereby, each piston 47 is displaced toward the brake disk 56 side in the cylinder 46A and the friction pad 48 which is pressed by each piston 47 is pushed against the both faces of the brake disk 56. As a result, the braking force is applied to the wheel mounting tube 18 which rotates integrally with the brake disk 56 and it becomes possible to stop the rear wheel 7.

In a case where braking is applied by the brake device 44 to the dump truck 1 which is traveling with a large amount of crushed stones loaded on the vessel 3, large loads act on fitting parts between the recessed groove fitting projections 51B, 52B, 53B, 54B of the respective disk mounting legs 51, 52, 53, 54 which configure the disk holding cylinder 49 and the respective U-shaped projections 58 of the brake disk 56 which hold these respective recessed groove fitting projections 51B, 52B, 53B, 54B in the circumferential direction.

However, in the first embodiment, the U-shaped projection 58 is provided on the outer periphery side of the brake disk 56 and the circumferential length dimension B1 of each engaging pawl 58A which configures the U-shaped projection 58 is set large. Thereby, the circumferential sectional area of the U-shaped projection 58 can be increased and the bending strength of each engaging pawl 58A can be increased. On the other hand, the thickness dimension 32 of the U-shaped projection 58 is set larger than the thickness dimension 33 of the friction pad abutting ring 57. Thereby, the contact areas between the recessed groove fitting projections 51B, 52B, 53B, 54B of the respective disk fitting legs 51, 52, 53, 54 which are provided on the disk holding cylinder 49 and the recessed grooves 58B of the U-shaped projections 58 can be increased.

Thereby, when braking is applied to the wheel mounting tube 18 by the brake device 44, the loads which are applied from the respective disk mounting legs 51, 52, 53, 54 of the disk holding cylinder 49 can be reliably received by the respective U-shaped projections 58 of the brake disk 56. As a result, even when the large loads are repetitively applied from the respective disk mounting legs 51, 52, 53, 54 of the disk holding cylinder 49 on the respective U-shaped projections 58 of the brake disk 56, the loads can be received by the respective U-shaped projection 58 of the brake disk 56. Therefore, the durability of the disk holding cylinder 49 and the brake disk 56 can be increased.

In addition, the brake disk 56 can be easily mounted to the disk holding cylinder 49 simply by bringing the recessed grooves 58B provided in the respective U-shaped projections 58 of the brake disk 56 into fit on the recessed groove fitting projections 51B, 52B, 53B, 54B provided on the respective disk mounting legs 51, 52, 53, 54 of the disk holding cylinder 49 and bringing the respective U-shaped projections 58 into abutment against the stepped portions 51C, 52C, 53C, 54C provided on the respective disk mounting legs 51, 52, 53, 54. Therefore, the workability when mounting and demounting the brake disk 56 to and from the disk holding cylinder 49 can be increased in comparison with a case of mounting the brake disk directly to the disk holding cylinder 49 by using, for example, many bolts.

Figure 13:
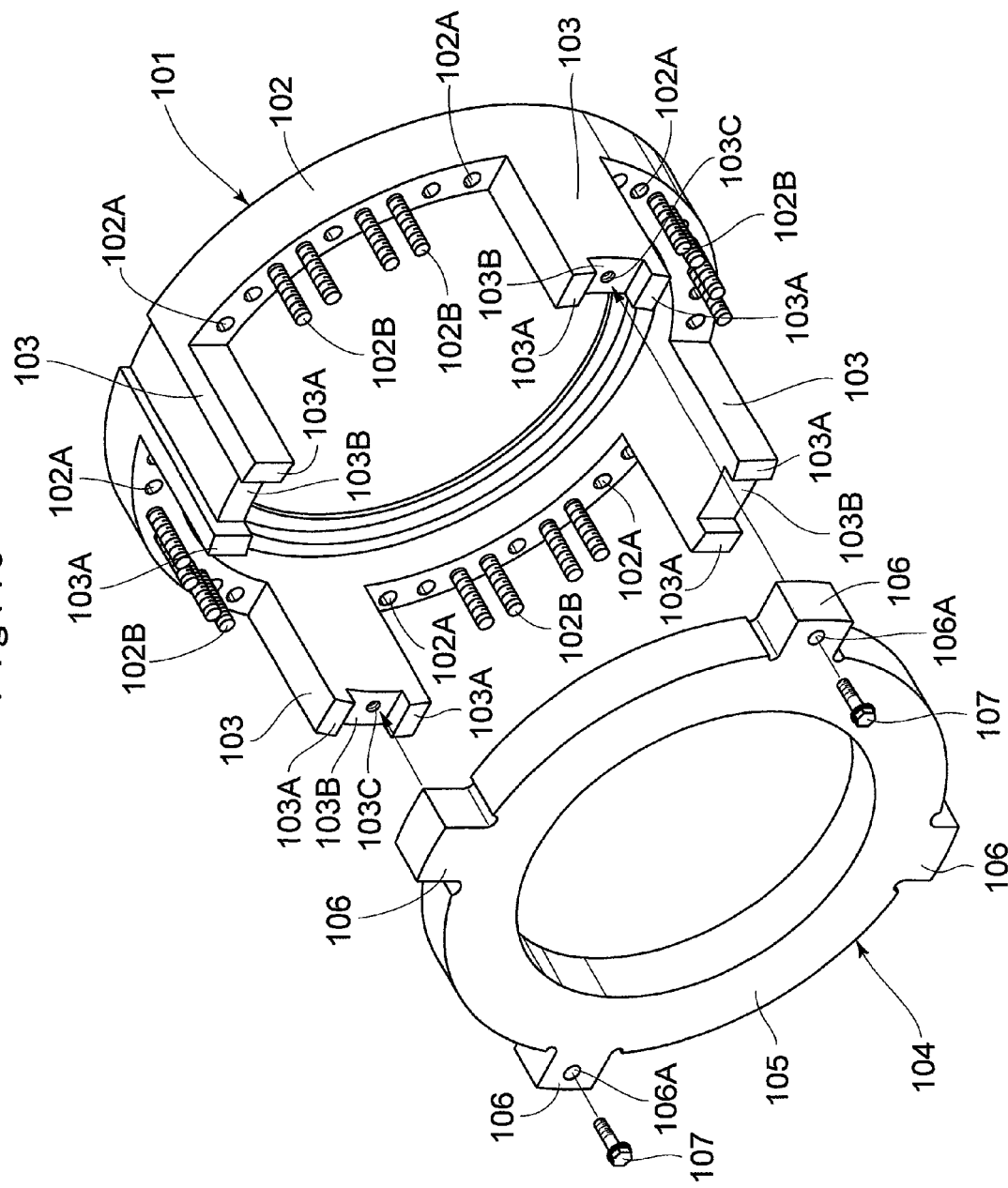
FIG. 13 is an exploded perspective view showing a disk holding cylinder and a brake disk according to a comparative example.
Figure 14:
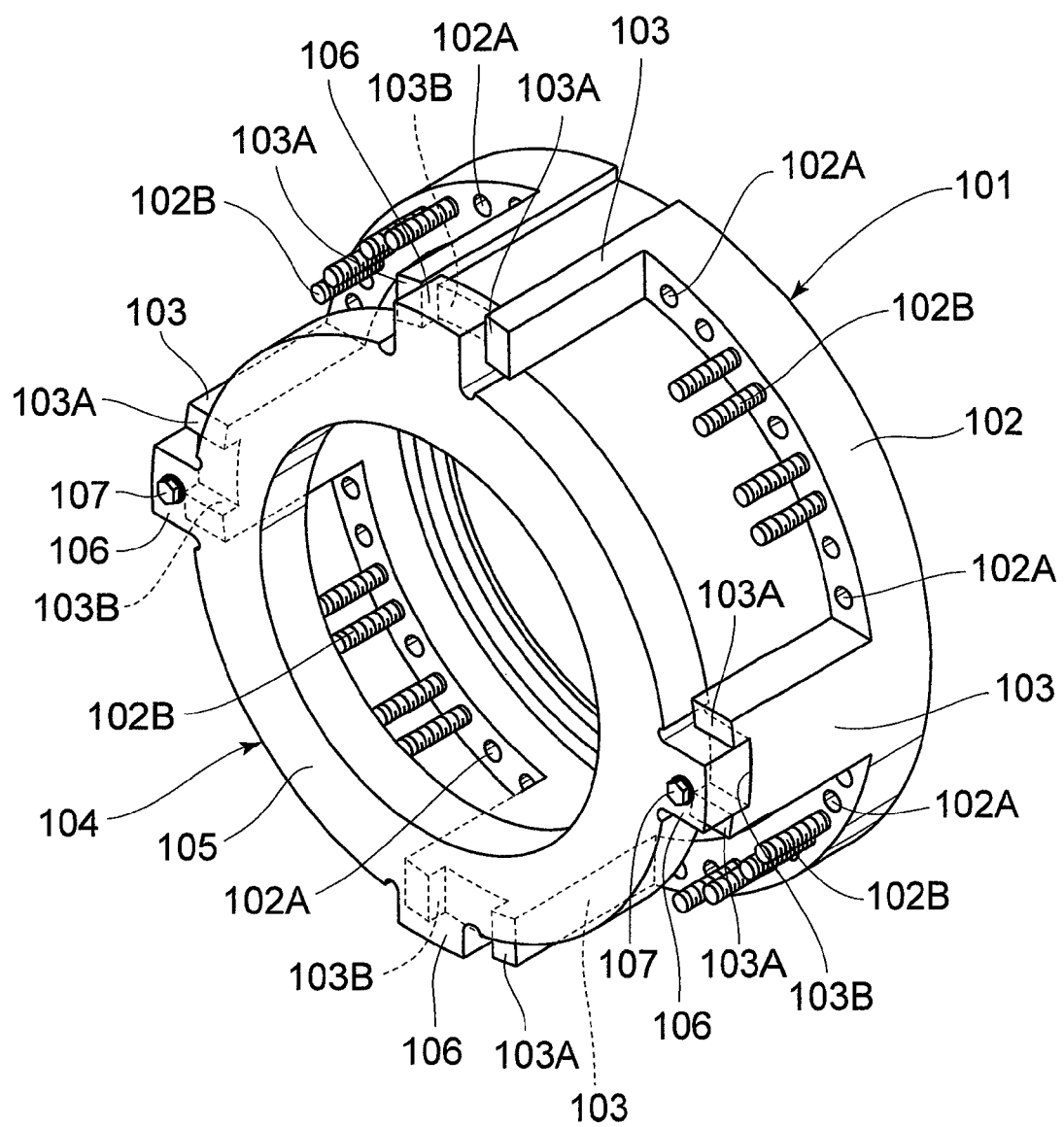
FIG. 14 is a perspective view showing a state that the disk holding cylinder and the brake disk according to the comparative example are assembled together.
Figure 15:
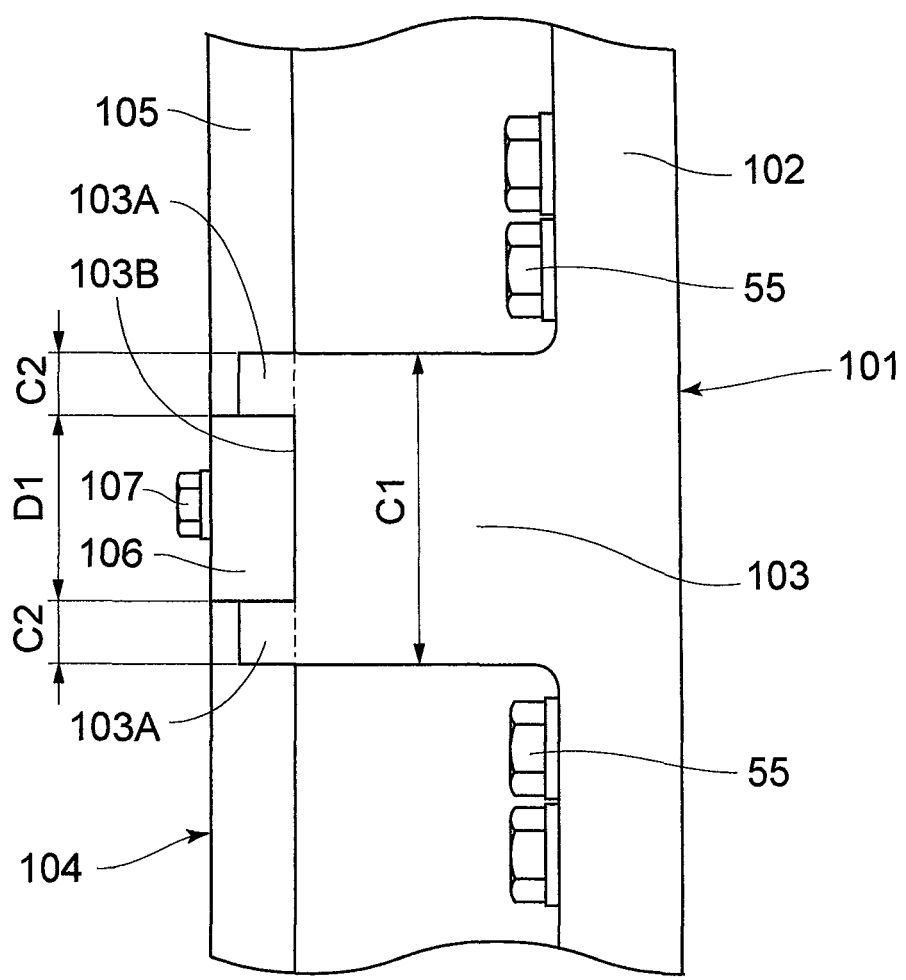
FIG. 15 is an enlarged view of essential parts showing the assembled state of the brake disk according to the comparative example similarly to FIG. 9.
Figure 16:
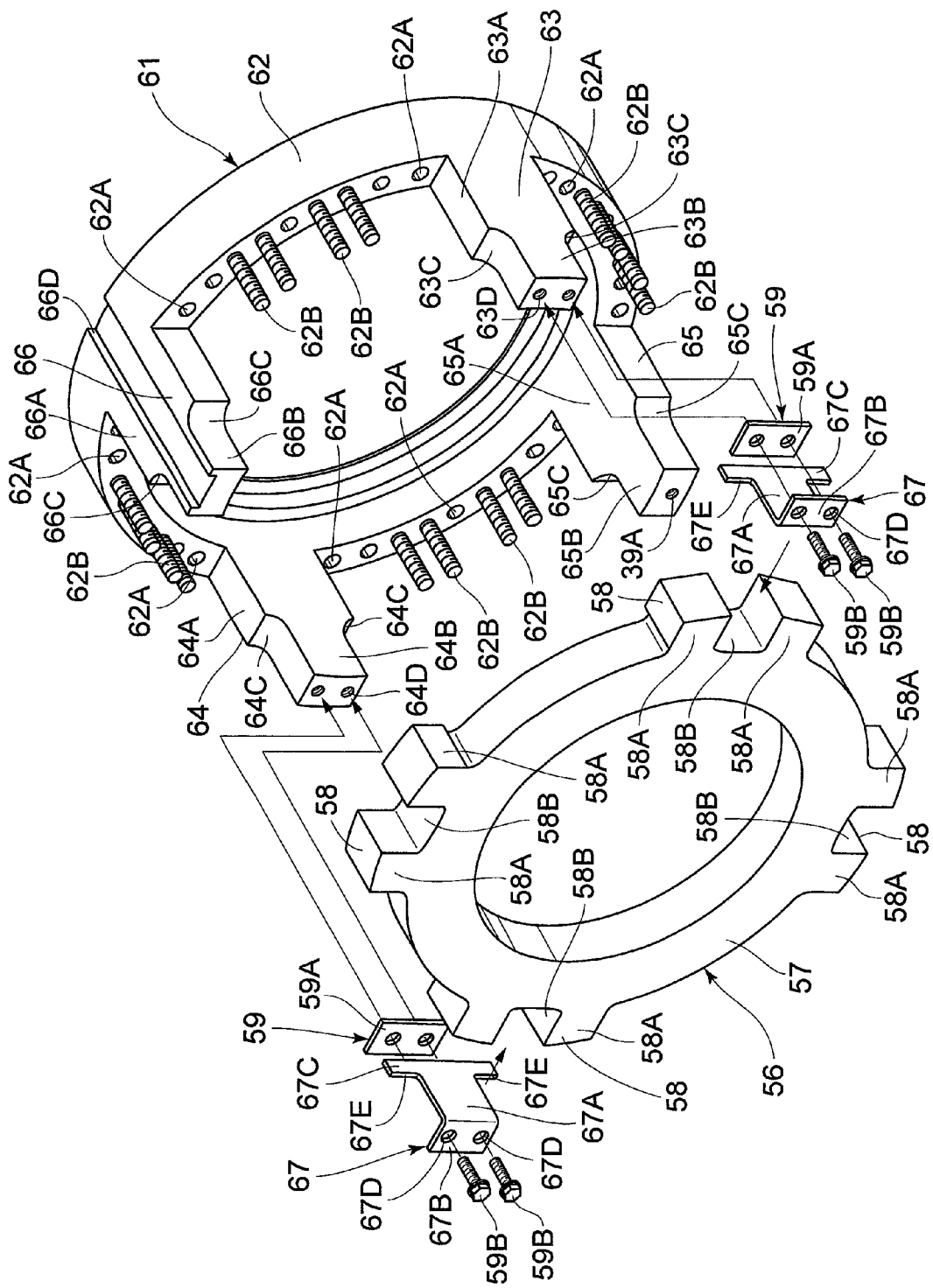
FIG. 16 an exploded perspective view showing a disk holding cylinder, a brake disk, a positioning member and the like according to a second embodiment similarly to FIG. 11.

Next, comparison between the disk holding cylinder 49 and the brake disk 56 according to the above-mentioned first embodiment and a disk holding cylinder 101 and a brake disk 104 according to comparative examples shown in FIG. 13 to FIG. 15 will be described.

The disk holding cylinder 101 according to the comparative example is configured by a cylindrical body 102 through which a plurality of bolt insertion holes 102A are formed and on which a plurality of stud bolts 102B are provided in a projected state and four disk mounting legs 103 which axially project outward from the cylindrical body 102. Here, a circumferential length dimension C1 of each disk mounting leg 103 is set equal to the circumferential length dimension A1 of the disk mounting leg 51 of the disk holding cylinder 49 according to the first embodiment. One pair of engaging pawls 103A are provided on a distal end of each disk mounting leg 103 so as to locate on circumferential both end sides and a recessed groove 103B is provided between the respective engaging pawls 103A. A female screw hole 103C is provided in the recessed groove 103B.

On the other hand, a brake disk 104 according to the comparative example is configured by a friction pad abutting ring 105 having an outer-diameter dimension which is generally equal to an inner-diameter dimension of the cylindrical body 102 of the disk holding cylinder 101 and four engaging projecting portions 106 which are radially projected outward from an outer peripheral edge of the friction pad abutting ring 105, and bolt insertion holes 106A are formed in the two engaging projecting portions 106. Each of the engaging projecting portions 106 of the brake disk 104 is fitted into the recessed groove 103B which is provided in each disk mounting leg 103 of the disk holding cylinder 101. The brake disk 104 is held by the disk holding cylinder 101 by screwing bolts 107 which are inserted into the bolt insertion holes 106A in the two engaging projecting portions 106 into the female screw holes 103C in the respective disk mounting legs 103 in this state.

Here, in the comparative example, each engaging projecting portion 106 provided on the brake disk 104 is brought into fit into the recessed groove 103B between the one pair of engaging pawls 103A provided on each disk mounting leg 103 of the disk holding cylinder 101. Accordingly, as shown in FIG. 15, the two engaging pawls 103A and the engaging projecting portion 106 of the brake disk 104 are arranged within the circumferential length dimension C1 of the disk mounting leg 103. Therefore, a circumferential length dimension C2 of each engaging pawl 103A is set small relative to a circumferential length dimension D1 of the engaging projecting portion 106.

As a result, there is such a problem that the durability of each engaging pawl 103A of the disk mounting leg 103 is reduced early caused by repetitive action of the large load from the engaging projecting portion 106 of the brake disk 104 onto each engaging pawl 103A of the disk mounting leg 103 provided on the disk holding cylinder 101 when braking by the brake device. However, since the circumferential length dimension C2 of each engaging pawl 103A cannot be increased within a range that the disk mounting leg 103 does not interfere with the long bolt 55, it is difficult to increase the strength of each engaging pawl 103A.

In contrast, in the first embodiment, the bifurcated U-shaped projection 58 having the one pair of engaging pawls 58A is provided on the outer periphery side of the brake disk 56. Therefore, the circumferential length dimension B1 of each engaging pawl 58A which configures the U-shaped projection 58 can be set large without increasing the circumferential length dimension A1 of each of the disk mounting legs 51, 52, 53, 54 which configure the disk holding cylinder 49. Thereby, the circumferential sectional area of the U-shaped projection 58 can be increased and the bending strength of each engaging pawl 58A can be increased.

In addition, in the first embodiment, the thickness dimension B2 of each U-shaped projection 58 which configures the brake disk 56 is set larger than the thickness dimension B3 of the friction pad abutting ring 57. Thereby, the contact areas between the recessed groove fitting projections 51B, 52B, 53B, 54B of the respective disk mounting legs 51, 52, 53, 54 which are provided on the disk holding cylinder 49 and the recessed grooves 58B in the U-shaped projections 58 can be increased.

As a result, even when the large loads are repetitively applied on the respective U-shaped projections 58 of the brake disk 56 from the respective disk mounting legs 51, 52, 53, 54 of the disk holding cylinder 49 by applying braking to the wheel mounting tube 18 by the brake device 44, the durability of the disk holding cylinder 49 and the brake disk 56 can be increased by reliably receiving the loads by the respective U-shaped projections 58 of the brake disk 56.

Moreover, according to the first embodiment, the arc-shaped step side arcuate portion 51E is provided on the corner part where the recessed groove fitting projection 51B and the stepped portion 51C of the disk mounting leg 51 meet. Likewise, the step side arcuate portions are respectively provided on the corner parts where the recessed groove fitting projections 52B, 53B, 54B and the stepped portions 52C, 53C, 54C of the disk mounting legs 52, 53, 54 meet. Thereby, concentration of the stress on the boundary parts between the recessed groove fitting projections 51B, 52B, 53B, 54B and the stepped portions 51C, 52C, 53C, 54C can be suppressed when braking by the brake device 44 and the strength of each of the recessed groove fitting projections 51B, 52B, 53B, 54B can be increased.

In addition, according to the first embodiment, the arc-shaped cylindrical body side arcuate portion 51F is provided on the corner part where the cylindrical body 50 of the disk holding cylinder 49 and the platform 51A of the disk mounting leg 51 meet. Likewise, the similar cylindrical body side arcuate portions are respectively provided on the corner parts where the cylindrical body 50 and the platforms 52A, 53A, 54A of the disk mounting legs 52, 53, 54 meet. Thereby, concentration of the stress on the boundary parts between the cylindrical body 50 of the disk holding cylinder 49 and the disk mounting legs 51, 52, 53, 54 can be suppressed when braking by the brake device 44 and the strength of each of the disk mounting legs 51, 52, 53, 54 can be increased.

Further, according to the first embodiment, the arc-shaped disk side arcuate portion 58C is provided on the corner part where the inner surface 57A of the friction pad abutting ring 57 of the brake disk 56 and the inner surface 58A1 of each U-shaped projection 58 meet. Thereby, concentration of the stress on the boundary part between the friction pad abutting ring 57 and each U-shaped projection 58 can be suppressed when braking by the brake device 44 and the strength of the brake disk 56 can be increased.

Next, FIG. 16 to FIG. 19 show a second embodiment of the present invention. The characteristic of the second embodiment lies in the configuration that a disk mounting leg of a disk holding cylinder is configured by a platform, a recessed groove fitting projection and a curved surface portion, and a positioning member is provided between the recessed groove fitting projection and a U-shaped projection of a brake disk. Incidentally, in the second embodiment, the component elements that are identical to those of the above-mentioned first embodiment will be simply denoted by the same reference numerals to avoid repetitions of similar explanations.

In the drawings, designated at 61 is a disk holding cylinder used in the second embodiment in place of the disk holding cylinder 49 according to the first embodiment. The disk holding cylinder 61 is configured by a short cylindrical body 62 through which a plurality of bolt insertion holes 62A are circumferentially bored in and on which a plurality of stud bolts 62B are axially projected and a plurality (for example, four) of disk mounting legs 63, 64, 65, 66 which will be described later almost in the same way as the one according to the first embodiment. However, the shape of each of the disk mounting legs 63, 64, 65, 66 is different from that of each of the disk mounting legs 51, 52, 53, 54 according to the first embodiment.

Designated at 63, 64, 65, 66 are the four disk mounting legs which axially project outward from the cylindrical body 62. These respective disk mounting legs 63, 64, 65, 66 are circumferentially arranged at angular intervals of 90 degrees and the brake disk 56 is mounted to their distal ends (projected ends).

Here, since the respective disk mounting legs 63, 64, 65, 66 have substantially outer shape, hereinafter, the disk mounting leg 63 will be described by way of example.

Figure 18:
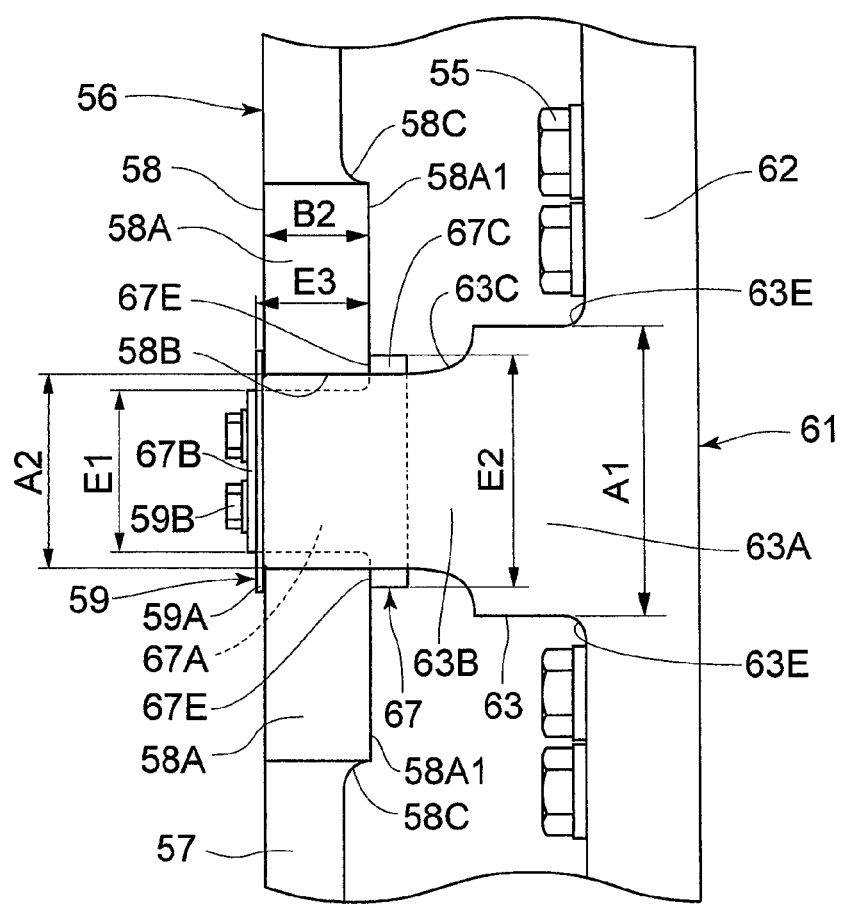
FIG. 18 is an enlarged view of essential parts showing essential parts of the disk mounting leg, a U-shaped projection, the positioning member and the like according to the second embodiment in an enlarged form similarly to FIG. 9.
Figure 19:
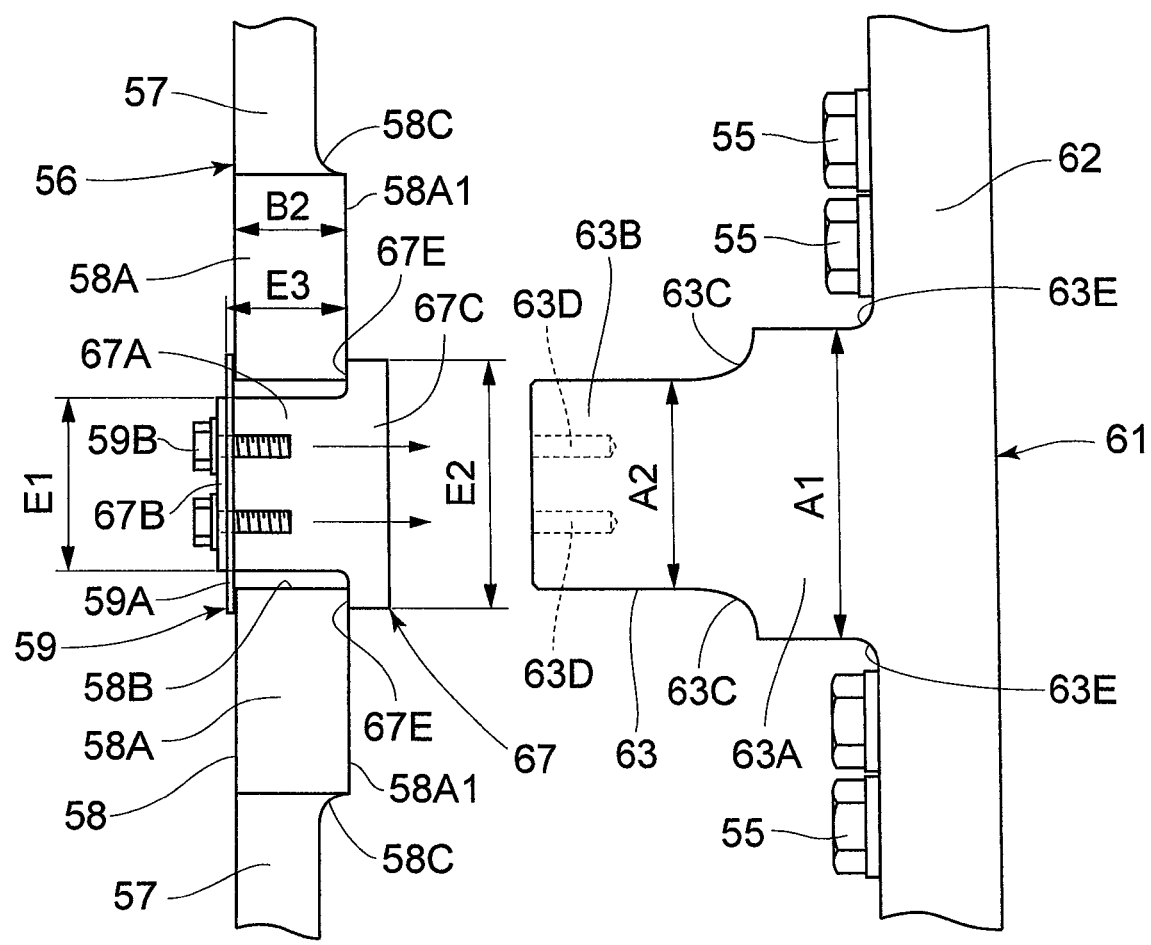
FIG. 19 is an enlarged view of essential parts showing a state that the disk mounting leg and the U-shaped projection in FIG. 8 are exploded.

The disk mounting leg 63 is configured by an arc-shaped platform 63A which axially projects from the cylindrical body 62, a recessed groove fitting projection 63B which is provided on the distal end side of the platform 63A and on which the recessed groove 58B provided in the U-shaped projection 58 of the brake disk 56 is to be fitted and an arc-shaped curved surface portion 63C which is provided between the platform 63A and the recessed groove fitting projection 63B so as to smoothly seriate both thereof with each other. As shown in FIG. 18 and FIG. 19, a circumferential length dimension A1 of the platform 63A is set lager than a circumferential length dimension A2 of the recessed groove fitting projection 63B. The recessed groove fitting projection 63B is arranged on a circumferential intermediate part of the disk mounting leg 63.

The curved surface portions 63C are respectively formed on circumferential both-side boundary parts between the platform 63A and the recessed groove fitting projection 63B and are adapted to seriate a circumferential side face of the platform 63A with a circumferential side face of the recessed groove fitting projection 63B in a smooth arc-shape. Thereby, a dimension difference between the circumferential length dimension A1 of the platform 63A and the circumferential length dimension A2 of the recessed groove fitting projection 63B can be gradually decreased by the arc-shaped curved surface portion 63C. Therefore, without an occurrence of a sudden change in shape between the platform 63A and the recessed groove fitting projection 63B, concentration of stress on the boundary part between the platform 63A and the recessed groove fitting projection 63B can be suppressed and the strength of the disk mounting leg 63 can be increased.

Heat treatment such as quenching and the like is performed on a face which comes into contact with the U-shaped projection 58 of the brake disk 56 in the recessed groove fitting projection 63B so as to configure that friction of the recessed groove fitting projection 63B caused by contact with the U-shaped projection 58 can be suppressed. Two female screw holes 63D are circumferentially formed in a distal end face of the recessed groove fitting projection 63B at intervals. Further, as shown in FIG. 18 and FIG. 19, arc-shaped cylindrical body side arcuate portions 63E for smoothly seriating both thereof with each other are provided on two corner parts (the roots of the disk mounting leg 63) where the cylindrical body 62 and the platform 63A of the disk mounting leg 63 meet.

On the other hand, also the disk mounting leg 64 which is circumferentially arranged together with the disk mounting leg 63 at an interval of 180 degrees thereto has a platform 64A, a recessed groove fitting projection 64B and an arc-shaped curved surface portion 64C similarly to the disk mounting leg 63. Two female screw holes 64D are formed in a distal end face of the recessed groove fitting projection 64B.

Also the disk mounting leg 65 which is circumferentially arranged together with the disk mounting leg 63 at an interval of 90 degrees thereto has a platform 65A, a recessed groove fitting projection 65B and a curved surface portion 65C similarly to the disk mounting leg 63. The opening end 39A of the above-mentioned drain hole 39 is arranged on a distal end face of the recessed groove fitting projection 65B.

On the other hand, also the disk mounting leg 66 which is circumferentially arranged together with the disk mounting leg 65 at an interval of 180 degrees thereto has a platform 66A, a recessed groove fitting projection 66B and a curved surface portion 66C similarly to the disk mounting leg 63. A hose accommodating groove 66D having a width dimension which is smaller than a circumferential length dimension of the recessed groove fitting projection 66B is formed in an outer peripheral surface of the disk mounting leg 66 so as to axially extend.

Next, designated at 67 are two positioning members and the respective positioning members 67 are respectively provided between the disk mounting leg 63 and the U-shaped projection 58 of the brake disk 56 and between the disk mounting leg 64 and the U-shaped projection 58 of the brake disk 56. These positioning members 67 are adapted to axially position the brake disk 56 relative to the respective disk mounting legs 63, 64 when the brake disk 56 is to be mounted to the disk mounting legs 63, 64.

Figure 17:
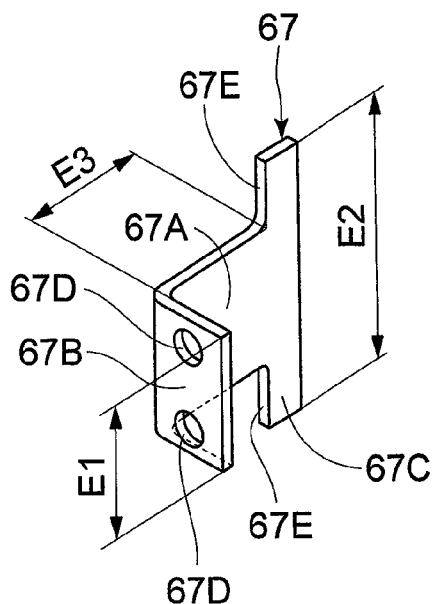
FIG. 17 is a perspective view showing the positioning member as a single unit in FIG. 16.

As shown in FIG. 17 to FIG. 19, the positioning member 67 is constituted of a plate body which is bent in an L-letter shape as a whole. This positioning member 67 is configured by a recessed groove engaging portion 67A which engages with the recessed groove 58B in the U-shaped projection 58 which is provided on the brake disk 56, a leg mounting portion 67B to be mounted to each of the recessed groove fitting projections 63B, 64B of the disk mounting legs 63, 64 and a disk abutting portion 67C which is made wider than the leg mounting portion 67B and abuts against the U-shaped projection 58 of the brake disk 56.

The leg mounting portion 67B of the positioning member 67 is bent from the recessed groove engaging portion 67A into the L-letter shape and abuts against a distal end face of each of the recessed groove fitting projections 63B, 64B of the disk mounting legs 63, 64. Two bolt insertion holes 67D are bored in the leg mounting portion 67B and the respective bolt insertion holes 67D correspond to the respective female screw holes 63D formed in the distal end face of the disk mounting leg 63 and the respective female screw holes 64D formed in the distal end face of the disk mounting leg 64.

The disk abutting portion 67C of the positioning member 67 has one pair of abutting step portions 67E which project to both the sides in a width direction from the recessed groove engaging portion 67A so as to pair with each other with the recessed groove engaging portion 67A interposed. The one pair of these abutting step portions 67E are adapted to abut against the inner surfaces 58A1 of the U-shaped projections 58 of the brake disk 56 (see, FIG. 18 and FIG. 19).

A width dimension E1 of each of the recessed groove engaging portion 67A and the leg mounting portion 67B of the positioning member 67 is set smaller than the circumferential length dimension A2 of the recessed groove fitting projection 63B of the disk mounting leg 63. On the other hand, a width dimension E2 of the disk abutting portion 67C of the positioning member 67 is set larger than the circumferential length dimension A2 of the recessed groove fitting projection 63B of the disk mounting leg 63 and larger than the circumferential length dimension (the groove width) of the recessed groove 58B of the brake disk 56. In addition, an interval E3 between the leg mounting portion 67B and each abutting step portion 67E of the positioning member 67 is set slightly (the amount corresponding to the plate thickness of the fixing plate 59A) larger than the thickness dimension B2 of the U-shaped projection 58.

The respective disk mounting legs 63 to 66 and the positioning member 67 of the disk holding cylinder 61 used in the second embodiment are configured as mentioned above, and hereinafter, a case of mounting the brake disk 56 to the disk mounting legs 63, 64 by using the positioning members 67 will be described.

As shown in FIG. 16 to FIG. 19, the recessed groove engaging portion 67A of the positioning member 67 is brought into engagement with the recessed groove 58B of the brake disk 56. Then, the fixing plate 59A of the disk fixing member 59 is interposed between the leg mounting portion 67B of the positioning member 67 and each engaging pawl 58A of the U-shaped projection 58 of the brake disk 56 and each abutting step portion 67E of the positioning member 67 is brought into abutment against the inner surface 58A1 of the U-shaped projection 58.

In this state, the recessed grooves 58B of the brake disk 56 are brought into fit on the recessed groove fitting projections 63B, 64B of the disk mounting legs 63, 64 together with the positioning member 67. On the other hand, the bolts 59B are inserted into the bolt insertion hole 67D in the positioning member 67 and the fixing plate 59A of the disk fixing member 59 and the bolts 59B are screwed into the female screw holes 63D, 64D in the disk mounting legs 63, 64.

Thereby, the leg mounting portions 67B of the positioning members 67 are fixed to distal end faces of the recessed groove fitting projections 63B, 64B of the disk mounting legs 63, 64 via the fixing plates 59A of the disk fixing members 59 and the disk abutting portions 67C of the positioning members 67 are fixed to the disk mounting legs 63, 64. At this time, since the inner surface 58A1 of the U-shaped projection 58 of the brake disk 56 abuts against each abutting step portion 67E of the disk abutting portion 67C, the brake disk 56 can be fixed to the respective disk mounting legs 63, 64 in a state that it is axially positioned.

Thus, according to the second embodiment, the positioning members 67 can be mounted to the recessed groove fitting projections 633, 64B of the respective disk mounting legs 63, 64 by using the disk fixing members 59. In this case, the bolts 59B are respectively fastened into the female screw holes 63D, 64D of the disk mounting legs 63, 64 in a state of holding the U-shaped projection 58 of the brake disk 56 between the disk abutting portion 67C of the positioning member 67 and the fixing plate 59A of the disk fixing member 59. Thereby, the brake disk 56 can be mounted to the respective disk mounting legs 63, 64 in a state that it is axially positioned.

Accordingly, in the disk holding cylinder 61 according to the second embodiment, it is not necessary to provide the stepped portions adapted to axially position the brake disk 56 to the respective disk mounting legs 63, 64. Therefore, the arc-shaped curved surface portion 63C can be provided between the platform 63A and the recessed groove fitting projection 63B of the disk mounting leg 63 and the arc-shaped curved surface portion 64C can be provided between the platform 64A and the recessed groove fitting projection 64B of the disk mounting leg 64. Thereby, concentration of the stress on the boundary part between the platform 63A and the recessed groove fitting projection 63B of the disk mounting leg 63 and the boundary part between the platform 64A and the recessed groove fitting projection 64B of the disk mounting leg 64 can be suppressed and the strength of the disk mounting legs 63, 64 can be increased.

In addition, similarly to this, the arc-shaped curved surface portion 65C can be provided between the platform 65A and the recessed groove fitting projection 65B of the disk mounting leg 65, and the arc-shaped curved surface portion 66C can be provided between the platform 66A and the recessed groove fitting projection 66B of the disk mounting leg 66. Thereby, concentration of the stress on the boundary part between the platform 65A and the recessed groove fitting projection 65B of the disk mounting leg 65 and the boundary part between the platform 66A and the recessed groove fitting projection 66B of the disk mounting leg 66 can be suppressed and the strength of the disk mounting legs 65, 66 can be increased.

Incidentally, in the embodiments, a case where the center in the thickness direction of each U-shaped projection 58 which configures the brake disk 6 is displaced from the center in the thickness direction of the friction pad butting ring 57 toward the disk holding cylinder 49 side is exemplified. Thereby, the outer surface which is axially located outside of each U-shaped projection 58 forms the same plane as the outer surface which is axially located outside of the friction pad abutting ring 57 and the inner surface 58A1 which is axially located inside of each U-shaped projection 58 projects more inward than the inner surface 57A which is axially located inside of the friction pad abutting ring 57.

Figure 20:
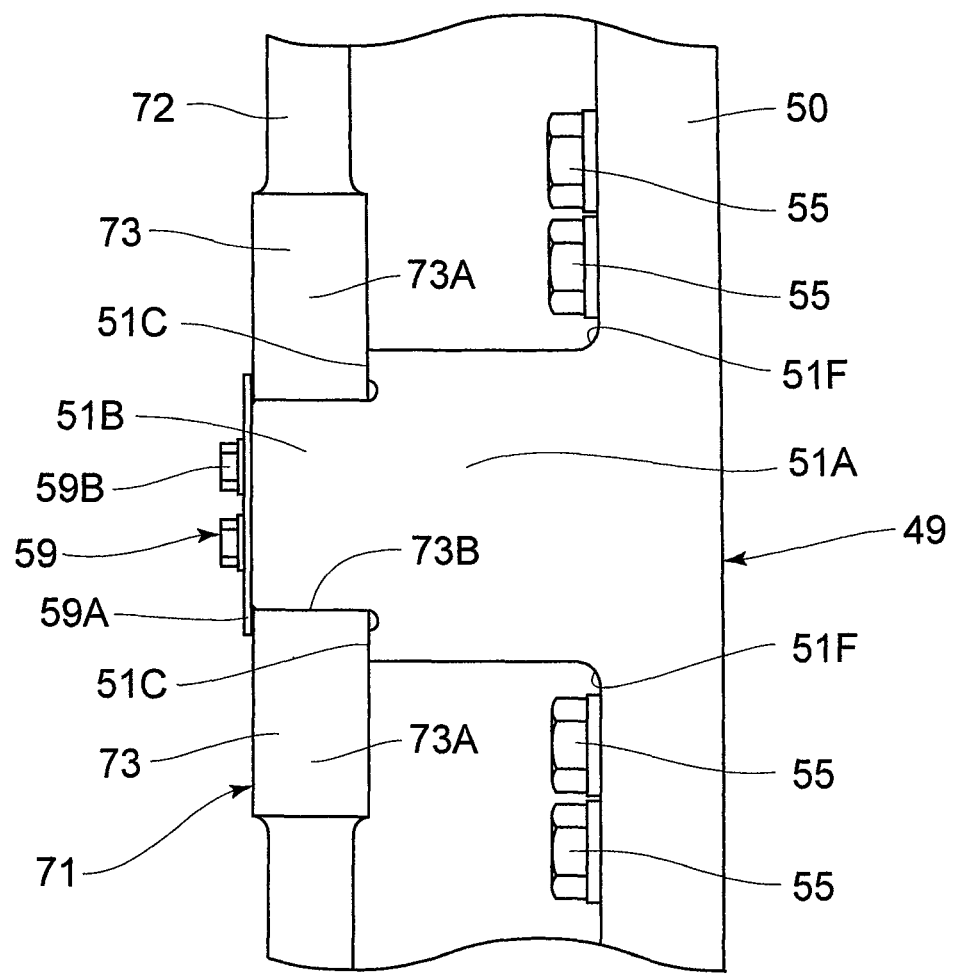
FIG. 20 is an enlarged view of essential parts showing a brake disk according to a first modified example similarly to FIG. 9.

However, the present invention is not limited to this and, for example, a brake disk 71 as in a first modified example shown in FIG. 20 may be used. That is, the brake disk 71 may be configured by a friction pad abutting ring 72 and a U-shaped projection 73 and may be configured such that a recessed groove 73B is provided between one pair of engaging pawls 73A which configure the U-shaped projection 73 and the center in a thickness direction (an axial direction) of each U-shaped projection 73 is made to match the center in a thickness direction (an axial direction) of the friction pad abutting ring 72. In this case, it results in the configuration that the axial both end faces of the U-shaped projection 73 (the engaging pawl 73A) equally project from both the end faces of the friction pad abutting ring 72.

Figure 21:
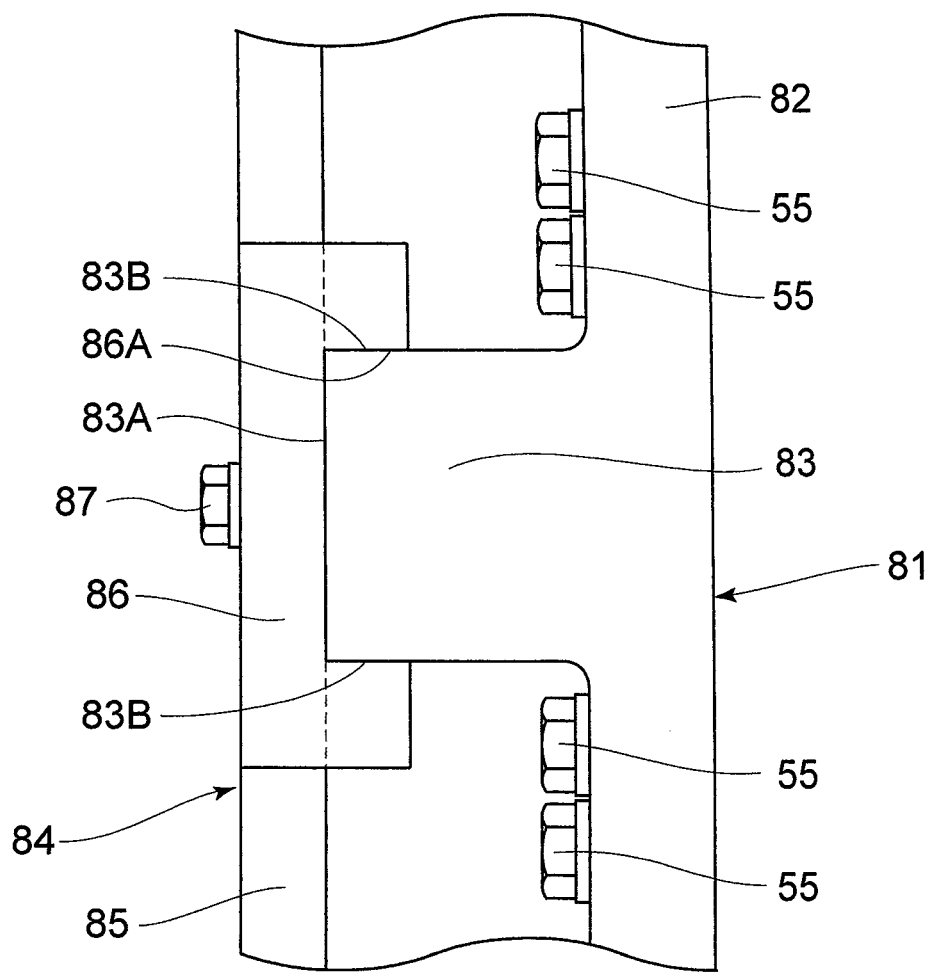
FIG. 21 is an enlarged view of essential parts showing a disk holding cylinder, a brake disk and the like according to a second modified example similarly to FIG. 9.

Next, in the embodiments, the configuration that the fixing plate 59A of the disk fixing member 59 is fixed to the recessed groove fitting projection 51B of the disk mounting leg 51 by using the bolts 59B and the brake disk 56 is axially fixed by this disk fixing member 59, is exemplified. However, the present invention is not limited to this and may be configured, for example, as in a second modified example shown in FIG. 21.

That is, a disk holding cylinder 81 is configured by a cylindrical body 82 and a plurality of disk mounting legs 83. On the other hand, a brake disk 84 is configured by a friction pad abutting ring 85 and a plurality of U-shaped projections 86 which correspond to the respective disk mounting legs 83 and a recessed groove 86A into which a distal end of the disk mounting leg 83 fit is provided in each U-shaped projection 86. In this case, the recessed groove 86A of the U-shaped projection 86 which is provided on the brake disk 84 is axially put on an axial end surface 83A and circumferential both end surfaces 83B of the disk mounting leg 83 which configures the disk holding cylinder 81. A configuration that in this state, the U-shaped projection 86 and the axial end surface 83A of the disk mounting leg 83 are fastened by a bolt 87 may be also made.

Figure 22:
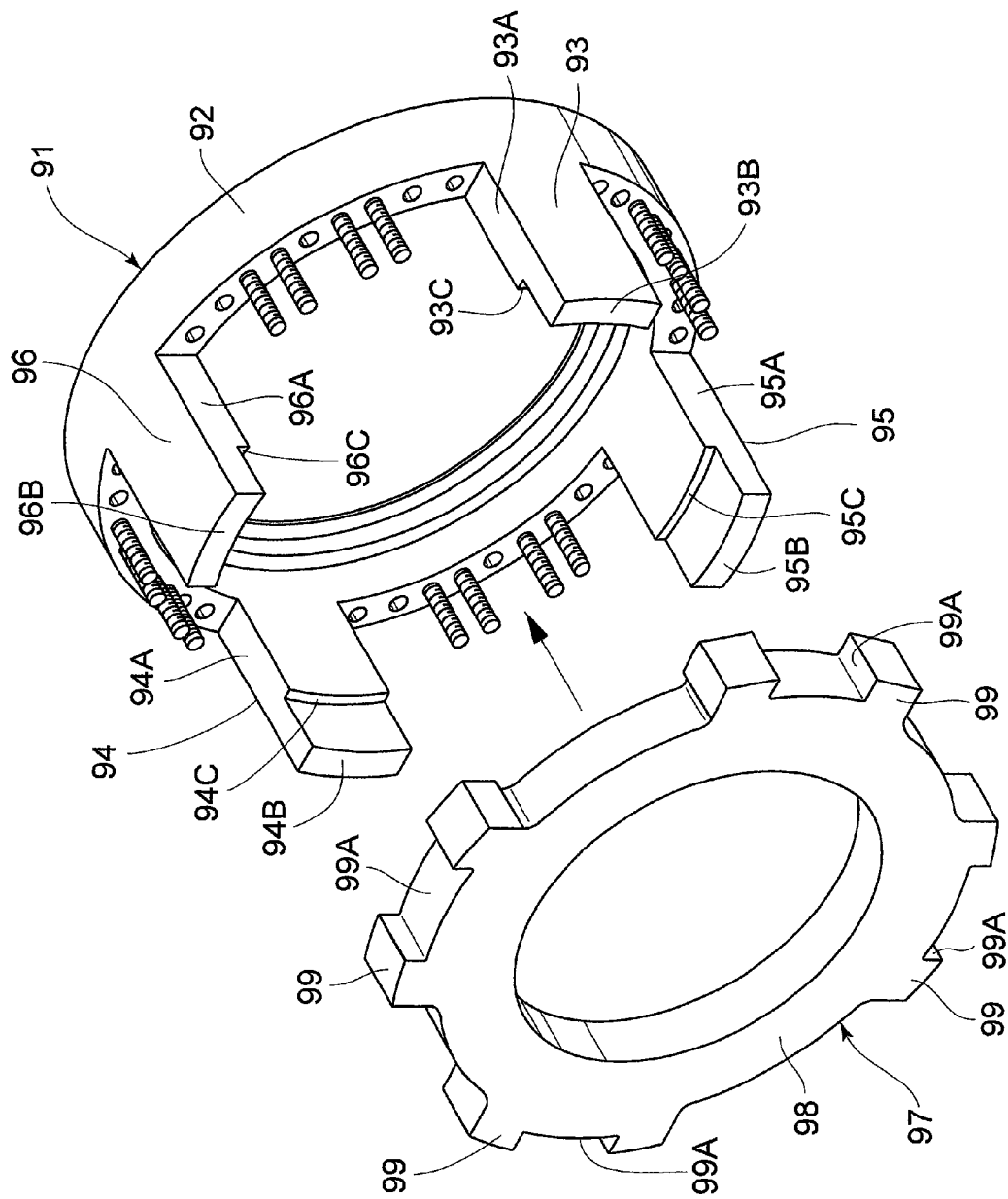
FIG. 22 is an exploded perspective view showing a disk holding cylinder and a brake disk according to a third modified example.

In addition, in the embodiments, the recessed groove fitting projections 51B to 54B each having the length dimension which is smaller than the circumferential length dimension of this platform 51A and the like are provided on the distal end sides of the platforms 51A to 54A which configure the respective disk mounting legs 51 to 54 of the disk holding cylinder 49. Then, a case where the one pair of stepped portions 51C to 54C are formed between the platforms 51A to 54A and the recessed groove fitting projections 51B to 54B is exemplified. However, the present invention is not limited to this and may be configured, for example, as in a third modified example shown in FIG. 22.

That is, a disk holding cylinder 91 may be configured by a cylindrical body 92 and a plurality of disk mounting legs 93, 94, 95, 96 and may be configured such that recessed groove fitting projections 93B, 94B, 95B, 96B each having a length dimension which is smaller than a radial length dimension (a thickness dimension) of each of the respective platforms 93A, 94A, 95A, 96A are provided on distal end sides of the platforms 93A, 94A, 95A, 96A which configure the respective disk mounting legs 93, 94, 95, 96. In this case, arc-shaped stepped portions 93C, 94C, 95C, 96C are formed on the inner peripheral sides of the recessed groove fitting projections 93B, 94B, 95B, 96B which configure the disk holding cylinder 91.

On the other hand, a brake disk 97 is configured by a friction pad abutting ring 98 and a plurality of U-shaped projections 99 which correspond to the respective disk mounting legs 93, 94, 95, 96 and recessed grooves 99A into which the recessed groove fitting projections 93B, 94B, 95B, 96B of the respective disk mounting legs 93, 94, 95, 96 are provided in the respective U-shaped projections 99. Thereby, the brake disk 97 can be axially fixed by bringing the recessed grooves 99A provided in the respective U-shaped projections 99 of the brake disk 97 into fit on the recessed groove fitting projections 93B, 94B, 95B, 96B of the disk holding cylinder 91 and by bringing the inner surfaces of the respective U-shaped projections 99 into abutment against the stepped portions 93C, 94C, 95C, 96C of the respective disk mounting legs 93, 94, 95, 96.

Further, in the second embodiment, the recessed groove engaging portion 67A and the leg mounting portion 67B of the positioning member 67 are set to have the equal width dimension E1. Then, the fixing plate 59A of the disk fixing member 59 is held between each engaging pawl 58A of the brake disk 56 and the leg mounting portion 67B of the positioning member 67 in a state of leaving the recessed groove engaging portion 67A engaged with the recessed groove 58B of the brake disk 56.

Figure 23:
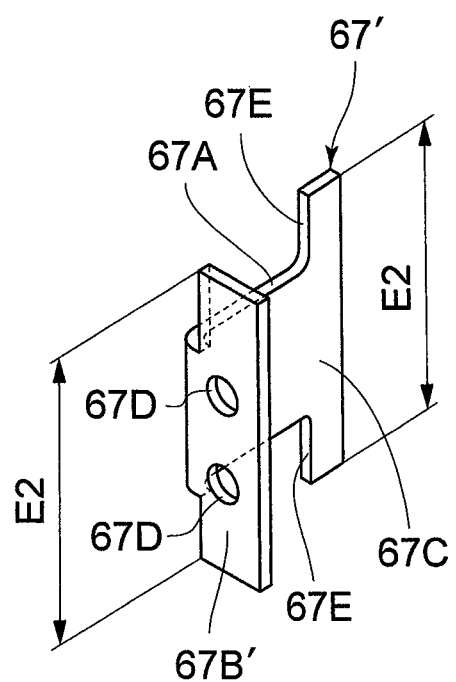
FIG. 23 is a perspective view showing a positioning member according to a fourth modified example similarly to FIG. 17.

However, the present invention is not limited to this and a width dimension of a leg mounting portion 67B' may be set to the width dimension E2 which is equal to that of the disk abutting portion 67C as in, for example, a positioning member 67' of a fourth modified example shown in FIG. 23. In this case, since the leg mounting portion 67B' abuts against each engaging pawl 58A across the recessed groove 58B of the brake disk 56, the fixing plate 59A of the disk fixing member 59 can be made unnecessary.

In the embodiments, a case where the reduction mechanism 22 is configured by two stages of the planetary gear reduction mechanisms 23, 31 is exemplified. However, the present invention is not limited to this and a reduction mechanism which is constituted of, for example, one stage or three or more stages of planetary gear reduction mechanism(s) may be used and reduction mechanisms other than the planetary gear reduction mechanism may be used.

Further, in the embodiments, a case where the electric motor 17 is used as the drive source is exemplified. However, the present invention is not limited to this and, for example, a hydraulic motor and the like may be used as the drive source of the traveling drive device.

DESCRIPTION OF REFERENCE NUMERALS

1: Dump truck
2: Vehicle body
7: Rear wheel (Wheel)
11: Traveling drive device
12: Axle housing
17: Electric motor (Drive source)
17A: Rotational shaft
18: Wheel mounting tube
20, 21: Wheel support bearing
22: Reduction mechanism
44: Brake device
49, 61, 81, 91: Disk holding cylinder
50, 62, 82, 92: Cylindrical body
51, 52, 53, 54, 63, 64, 65, 66, 83, 93, 94, 95, 96: Disk mounting leg
51A, 52A, 53A, 54A, 63A, 64A, 65A, 66A, 93A, 94A, 95A, 96A: Platform
51B, 52B, 53B, 54B, 63B, 64B, 65B, 66B, 93B, 94B, 95B, 96B: Recessed groove fitting projection
51C, 52C, 53C, 54C, 93C, 94C, 95C, 96C: Stepped portion
51E: Step side arcuate portion
51F: Cylindrical body side arcuate portion
56, 71, 84, 97: Brake disk
57, 72, 85, 98: Friction pad abutting ring
57A, 58A1: Inner surface
58, 73, 86, 99: U-shaped projection
58B, 73B, 86A, 99A: Recessed groove
58C: Disk side arcuate portion
59: Disk fixing member
63C, 64C, 65C, 66C: Curved surface portion
67, 67': Positioning member
67A: Recessed groove engaging portion
67B, 67B': Leg mounting portion
67C: Disk abutting portion

The invention claimed is:

1. A traveling drive device for a dump truck comprising:
a tubular axle housing which is mounted to a vehicle body of the dump truck in a non-rotational state;
a drive source provided in said axle housing;
a rotational shaft which is provided so as to axially extend in said axle housing and is rotationally driven by said drive source;
a wheel mounting tube which is rotatably provided on the axial outside of said axle housing and on the outer periphery side thereof via wheel support bearings and to which a wheel is mounted;
a reduction mechanism which is provided between said wheel mounting tube and said axle housing to decelerate rotation of said rotational shaft for transmission to said wheel mounting tube;
a tubular disk holding cylinder which is provided on the axial outside of said wheel mounting tube;
an annular brake disk which is mounted to said disk holding cylinder and rotates together with said wheel mounting tube; and
a brake device which applies braking to said wheel mounting tube by pressing a friction pad against said brake disk,
wherein said disk holding cylinder is configured by a cylindrical body which is mounted to said wheel mounting tube and a plurality of disk mounting legs which are provided on said cylindrical body at intervals in a circumferential direction thereof and axially project outward from said cylindrical body,
wherein a plurality of U-shaped projections, which are respectively disposed at positions corresponding to said respective disk mounting legs, are provided on an outer peripheral edge of a friction pad abutting ring which said friction pad of said brake disk abuts,
wherein said U-shaped projections are each configured to have a recessed groove to engage with ones of said disk mounting legs so as to hold a distal end of ones of said disk mounting legs therein in the circumferential direction,
wherein said disk mounting legs of said disk holding cylinder are each configured to have a platform which axially projects from said cylindrical body, a recessed groove fitting projection which is provided on the distal end side of said platform, and an arc-shaped curved-surface portion which is provided between said platform and said recessed groove fitting projection, where a circumferential dimension (A2) of said recessed groove fitting projection is less than a circumferential dimension (A1) of said platform,
wherein ones of said recessed groove fitting projections fit into corresponding ones of said recessed grooves of said brake disk,
wherein an axial thickness dimension (B2) of each of said U-shaped projections is greater than an axial thickness dimension (B3) of said friction pad abutting ring,
wherein an arc-shaped curved-surface portion is provided between said platform and said recessed groove fitting projection to smoothly engage with each other,
wherein a plurality of positioning members that axially position said brake disk relative to at least two of the disk mounting legs are provided between each of said at least two disk mounting legs and said U-shaped projections of said brake disk, and
wherein said positioning members are each configured by a recessed groove engaging portion which engages with said recessed groove of one of said U-shaped projections, a leg mounting portion which is mounted to said recessed groove fitting projections of one of said disk mounting legs, and a disk abutting portion which positions said brake disk by abutting against one of said U-shaped projections of said brake disk.

2. The traveling drive device for the dump truck according to claim 1, wherein
a plurality of arc-shaped disk side arcuate portions are provided on corner parts where an inner surface facing said cylindrical body in said friction pad abutting ring and an inner surface facing said cylindrical body in each of said U-shaped projections meet.

3. The traveling drive device for dump truck according to claim 1, wherein
said reduction mechanism has a ring gear which is mounted to said wheel mounting tube and on the inner periphery side of which inner teeth are formed, said disk holding cylinder is configured to be mounted to said wheel mounting tube coaxially with said ring gear, and said disk holding cylinder configures a part of said wheel mounting tube together with said ring gear.

* * * * *